United States Patent
Zieger

(10) Patent No.: US 9,360,084 B2
(45) Date of Patent: Jun. 7, 2016

(54) CUTTING AND SPLICING APPARATUS FOR CONVEYOR BELTS AND METHOD

(71) Applicant: Flexible Steel Lacing Company, Downers Grove, IL (US)

(72) Inventor: Andrew J. Zieger, Grand Rapids, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 14/299,958

(22) Filed: Jun. 9, 2014

(65) Prior Publication Data

US 2014/0283984 A1     Sep. 25, 2014

Related U.S. Application Data

(62) Division of application No. 13/304,042, filed on Nov. 23, 2011, now Pat. No. 8,770,253.

(51) Int. Cl.
*B29C 65/02* (2006.01)
*F16G 3/10* (2006.01)
(Continued)

(52) U.S. Cl.
CPC ................ *F16G 3/10* (2013.01); *B25B 23/141* (2013.01); *B26D 3/003* (2013.01); *B26D 1/06* (2013.01);
(Continued)

(58) Field of Classification Search
CPC ............ B29C 66/4324; B29C 66/5241; B29C 66/1142; B29C 65/1412; B29C 65/7844; B29C 65/1432; B29C 65/782; Y10T 156/1062; Y10T 156/1066; Y10T 156/12; Y10T 156/125; Y10T 156/14; Y10T 156/1744; F16G 3/003; F16G 3/10; F16G 3/16

See application file for complete search history.

(56) References Cited

U.S. PATENT DOCUMENTS

| 839,028 A | 12/1906 | Porter |
|---|---|---|
| 1,459,822 A | 6/1923 | Carleton |

(Continued)

FOREIGN PATENT DOCUMENTS

| DE | 920478 | 11/1954 |
|---|---|---|
| DE | 927 315 C | 5/1955 |

(Continued)

OTHER PUBLICATIONS

Notification of Transmittal of the International Search Report and the Written Opinion of the International Searching Authority, or the Declaration from the International Bureau of WIPO for corresponding International Application No. PCT/US2012/065050. dated Feb. 5, 2013, 13 pages.

(Continued)

*Primary Examiner* — Linda L Gray
(74) *Attorney, Agent, or Firm* — Fitch, Even, Tabin & Flannery LLP

(57) ABSTRACT

A belt cutting and splicing apparatus is provided for joining together the ends of one or more monolithic conveyor belts. In one form, a belt support is configured to support the belt ends in spaced relation to each other and a non-contact heating device is provided for being disposed between the belt ends to generate thermal radiation for joining the belt ends together. In another form, a drive mechanism is operable to cause relative movement of a pair of platens, for supporting belt ends, toward and away from each other and a heating device between heating and stowed positions. An actuator of the drive mechanism is movable by an operator between at least three operation positions corresponding to three different operation positions of the platens. An on-board belt cutting mechanism is provided for precision cutting of the belt ends using the same apparatus for both belt cutting and splicing operations.

5 Claims, 21 Drawing Sheets

(51) Int. Cl.
    *B25B 23/14*     (2006.01)
    *B26D 3/00*     (2006.01)
    *F16G 3/16*     (2006.01)
    *F16G 3/00*     (2006.01)
    *B29C 65/00*     (2006.01)
    *B29C 65/14*     (2006.01)
    *B29C 65/78*     (2006.01)
    *B26D 1/06*     (2006.01)

(52) U.S. Cl.
    CPC ......... *B29C 65/1412* (2013.01); *B29C 65/1432* (2013.01); *B29C 65/782* (2013.01); *B29C 65/7844* (2013.01); *B29C 66/1142* (2013.01); *B29C 66/4324* (2013.01); *B29C 66/5241* (2013.01); *F16G 3/003* (2013.01); *F16G 3/16* (2013.01); *Y10T 29/53961* (2015.01); *Y10T 156/1062* (2015.01); *Y10T 156/1066* (2015.01); *Y10T 156/12* (2015.01); *Y10T 156/125* (2015.01); *Y10T 156/1322* (2015.01); *Y10T 156/14* (2015.01); *Y10T 156/1744* (2015.01)

(56) References Cited

U.S. PATENT DOCUMENTS

| | | | |
|---|---|---|---|
| 2,566,262 | A | 8/1951 | Traxler |
| 3,994,767 | A | 11/1976 | Smith |
| 4,414,048 | A | 11/1983 | Kontz |
| 4,781,787 | A | 11/1988 | Weissfloch et al. |
| 5,020,209 | A | 6/1991 | Fullard |
| 5,329,094 | A | 7/1994 | Murphy et al. |
| 5,499,565 | A | 3/1996 | Hansen et al. |
| 5,562,796 | A | 10/1996 | Ertel |
| 6,086,806 | A | 7/2000 | Weatherall et al. |
| 6,234,304 | B1 | 5/2001 | DeGroot et al. |
| 7,815,043 | B2 | 10/2010 | Hawkins et al. |
| 8,132,489 | B2 | 3/2012 | Zieger |
| 8,770,253 | B2 | 7/2014 | Zieger |
| 2002/0050445 | A1 | 5/2002 | Shaffer |
| 2009/0074544 | A1 | 3/2009 | Borner et al. |
| 2011/0067801 | A1 | 3/2011 | Van 'T Schip |

FOREIGN PATENT DOCUMENTS

| | | |
|---|---|---|
| DE | 4417668 A1 | 11/1995 |
| FR | 2785657 A1 | 5/2000 |
| GB | 565475 | 11/1944 |
| JP | 62041442 | 2/1987 |
| JP | 2009-257575 A | 11/2009 |

OTHER PUBLICATIONS

Extended European Search Report and European Search Opinion issued in counterpart European Application No. 12851553.3, dated Aug. 12, 2015 (7 pages).

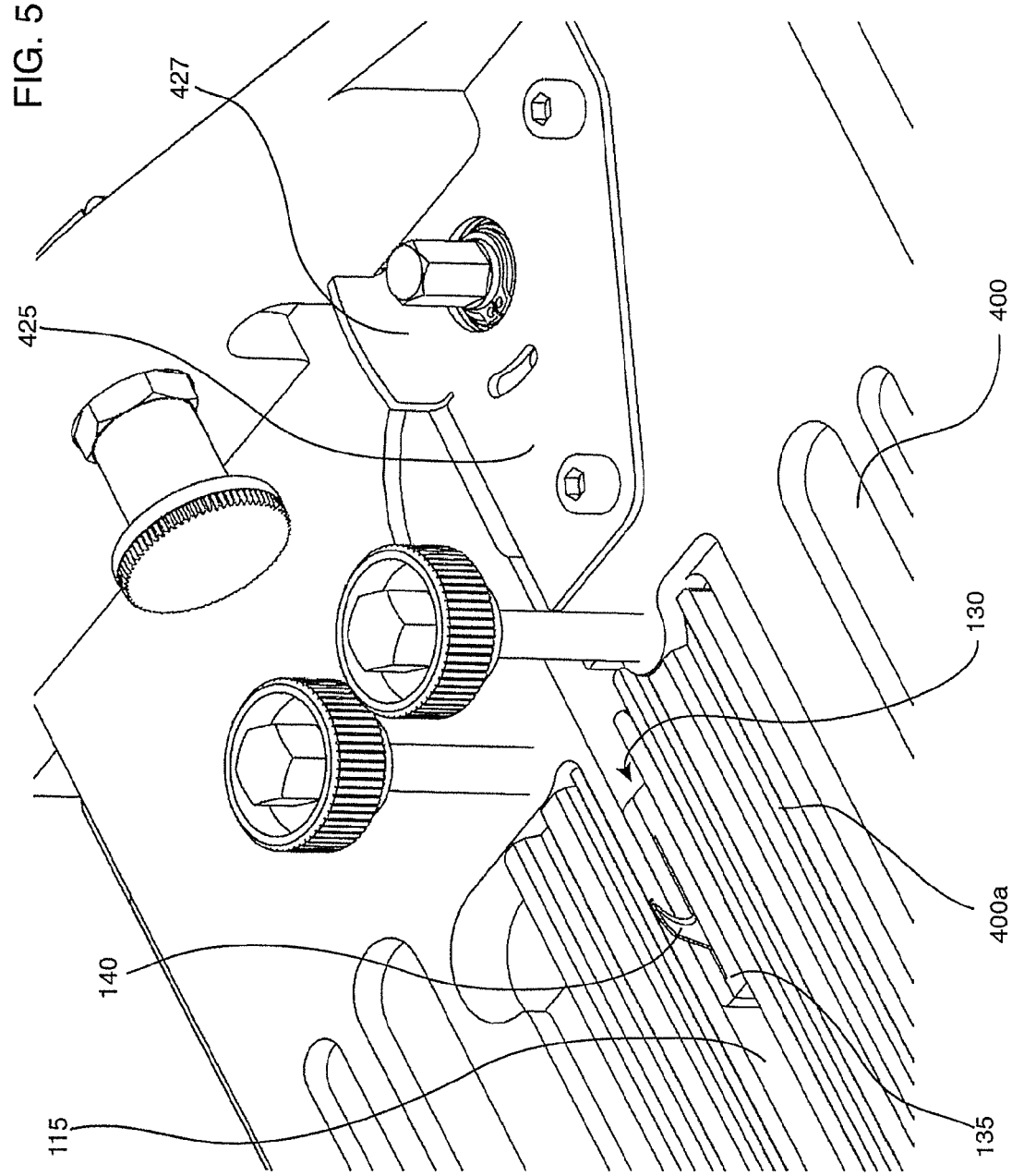

CUTTING AND SPLICING APPARATUS FOR CONVEYOR BELTS AND METHOD

CROSS REFERENCE TO RELATED APPLICATIONS

This application is a divisional of U.S. patent application Ser. No. 13/304,042, filed Nov. 23, 2011, the entire content of which is hereby incorporated herein by reference in its entirety.

FIELD OF THE INVENTION

The invention relates to an apparatus for preparing and joining ends of one or more conveyor belts together and, more particularly, to a cutting and splicing apparatus for cutting and joining conveyor belt ends together.

BACKGROUND OF THE INVENTION

Several industries utilize conveyor and process belts for transporting loads from one location to another location or for passing loads through successive processing operations. Various types of conveyor belts are used for this purpose depending on the application, the materials being transported, and the environmental conditions under which the conveyor belt is operating. For example, traditional conveyor belts include layers or plies of fabric carcass material embedded between thermoplastic or rubber layers. On the other hand, monolithic conveyor belts are often used in applications that require light to medium duty conveyor belts, particularly where sanitary conditions are required, such as, for example, in the food industry. Unlike traditional conveyor belts, monolithic conveyor belts are typically formed from a single homogenous material, for example a thermoplastic material, although they may include other composite materials such as reinforcing fibers. Forming the belt from a single thermoplastic material is often desirable because the thermoplastic material is less prone to providing sites for microbiological growth due to contamination from, for example, contact with conveyed food or dairy products. Several other types of conveyor belts are also utilized in various industries and are selected depending on the demands of a particular application.

During installation and repair of conveyor belts, it is often necessary to join together the ends of one or more belts. Various tools and methods have been used to join the conveyor belt ends together. For example, mechanical fasteners are used to mechanically fasten the belts together. Similarly, adhesives are similarly used to adhere the ends of the conveyor belt ends to one another. Other approaches including vulcanized splicing or welding of the belt ends, which includes heating the belt ends to a temperature near or above the melting temperature of at least a component of the belt material and simultaneously or subsequently abutting the belt ends together to allow the material of the belt ends to intermix and harden to join the belt ends together. Other joining techniques, including cold bonding, are also known for joining the belt ends together.

While several methods exist for joining the belt ends to one another, the ends of the belts must typically be prepared in advance of being joined. To this end, the belt ends are typically cut or prepared in a manner that allows the belt ends to abut each other in a manner that will result in the belt ends being aligned when the ends are joined together. In one approach, the belt ends are prepared in corresponding finger-shaped or other corresponding patterns that intermesh with each other so that the belt ends abut or are closely adjacent with both of the belts extending in a generally longitudinal direction so that a square belt is formed. In another approach, the belts are cut across their lateral width to square the belt ends so that they extend orthogonally or at similar angles to the belt edges, so that the ends are relatively straight and parallel with the belts each extending in a longitudinal direction so that the belt ends can be joined together to form a generally linear belt or square belt.

A typical conveyor belt joining process for cutting and joining the belt ends generally includes first cutting the conveyor belt ends so that the belt ends can be positioned end-to-end with the belts being generally square to one another. The belts are subsequently joined together by one of the processes described above, either by hand or using a separate tool.

Commonly owned U.S. patent application Ser. No. 12/888,411, published as US 2011/0067801, to van 't Schip, incorporated in its entirety by reference herein, describes a conveyor belt welding apparatus for welding together the ends of one or more monolithic conveyor belts, and is hereby incorporated by reference as if it were reproduced in its entirety herein. In the '801 publication, the welding apparatus includes a pair of spaced grooved platens for supporting the conveyor belt ends and a heating device that is movable to a position between the belt ends for heating and melting the material thereof. After moving the heating device to a stowed position, the belt ends are then moved toward each other to intermix the belt material of the two ends which then cools to join the ends together. The application describes that the welding apparatus may be used for positive drive conveyor belts, which include depending projections such as laterally extending fins or ribs that depend from the bottom of the belt and interengage with and are driven by mating recesses in a drive pulley of the conveyor belt system. Alternatively, rows of depending lugs may be utilized instead of a continuous fin or rib. Herein, the term drive bar will be utilized and will be understood to include both a continuously extending fin or rib as well as a row of lugs. The '801 Publication describes a separate cutting template used to form square cuts across a positive drive belt and which is sized to maintain the distance or "pitch" between adjacent drive bars after the belt is joined together. The cutting template is placed near the belt end and includes grooves that receive one or more drive bars of the belt end to be cut. The cutting template includes a cutting guide edge that is spaced a predetermined distance from an adjacent groove so that a predetermined pitch may be maintained between adjacent drive bars of the belt. With the belt placed on a flat surface so that the drive bars project upwardly, the cutting template is place on the belt end with the drive bars received in the grooves and a utility knife is manually drawn along the template cutting guide edge to cut or score the belt a predetermined distance from the adjacent drive bar.

Another conveyor belt welding device provided by Intralox includes a clamping fixture having a pair of grooved decks with a drive mechanism for shifting the decks, and the belt ends supported thereon toward and away from each other. A separate elongate contact heating wand is provided to be manually inserted between the belt ends by an operator. The operator then drives the decks toward one another to engage the belt ends against the heating wand to melt the belt ends. The wand is removed and the belt ends are shifted more closely together to clash the belt ends together and form a weld therebetween.

For preparing the belt ends, the belt welding device includes a separate cutting guide with grooves for receiving the drive bars of a positive drive belt. The belt may be prepared using the clamping fixture with the belt supported on the decks facing up or down with the belt drive bars received in the grooves of either the cutting guide or the deck. If the drive bars face up with the belt end supported on the decks, the operator needs to visually align the drive bars with the grooves in the underlying decks. Otherwise, the belt end has its drive bars received in the grooves of the decks. The belt end to be cut is pulled over a first one of the decks, over the gap between the grooved decks, and onto the second deck until at least an inch of material extends past the far edge of the second deck. The cutting guide is connected to the second deck, clamped down on the belt end portion and an operator manually draws a utility knife along the straight guide edge of the cutting guide to cut the belt end. The opposite belt end is prepared in the same manner. After the belt ends are cut, the belts ends are moved to their respective heating and joining grooved deck and their drive bars are inserted into grooves of the grooved decks where they will be heated and joined as described previously.

While the cutting template and cutting guides, are useful for forming relatively square belt ends for joining together conveyor belt ends, both are time consuming and require additional pieces of equipment that belt repair personnel must transport to the location where a belt needs to be repaired or installed. One of the cutting guides has to be individually mounted to the device for cutting, and then removed from the device after the first belt end has been cut to allow for the next belt end to be cut, with another cutting guide then mounted to the device for cutting the second belt end. In addition, the quality of the cut belt end will vary because it depends on the operator holding the knife in a vertical position and closely following the cutting guide along the cutting edge. If an operator holds the cutting knife at an incline from the vertical position or accidentally moves the knife away from the cutting edge, the belt ends may not be evenly squared across their lateral ends resulting in uneven heating and potentially gaps being formed between the resulting welded belt ends. Unsquare belt ends may also result in the belts not being properly aligned when they are joined.

Further, because the grooves for both the cutting template and cutting guide and the belt support platens or grooved decks in the above systems are machined with tolerances, cutting with the drive bars in the grooves of the cutting template or cutting guides and subsequently heating and welding the belts together with the belts on the platens or decks and the drive bars positioned in platen or deck grooves can lead to tolerance stackup problems. Similarly, when the belt is cut with the drive bars facing down and received in a different groove on the grooved deck than the groove the drive bar will be in during heating and joining operations as in the Intralox device, tolerances in the machining of the different grooves of the groove deck can result in tolerance stackup. The tolerance stackup can result in inaccurate positioning of the cut end portions relative to the heating element so that the belt ends do not receive the correct amount of heat, and so that the amount of clash between the belt ends varies from a predetermined amount of clash, forming a weaker weld. Problems associated with lack of uniform heating include potential buckling of the belt in the splice area or having an undesirable increase in the pitch where an insufficient amount of belt material is melted, or none at all so that there is little or no intermixing of belt material from both of the belt ends to be joined in the area that is insufficiently heated. Alternatively, too much heat can result in burning or bubbling of the belt material which also can create a non-uniform splice.

Problems associated with small variations in the cut belt ends and tolerance stackup may be magnified in these systems, because during welding, for example with the apparatus described by van 't Schip, the heated belt ends may only be clashed together by a very small amount, for example 1 mm, so that small variations in the amount of belt material at the cut belt ends may result in portions of the lateral widths of the belts being clashed together by too little or too great an extent. This can have an adverse effect on maintaining a precise pitch between drive bars across the splice. In addition, in the van 't Schip apparatus, the belts are positioned at a predetermined heating position where the belt ends are positioned a predetermined distance from a non-contact heating element where the amount of radiant heat the belts receive is a function of the distance of the belts from the heating element, so variations in the cut along the belt lateral width may result in uneven heating of the belt ends.

U.S. Pat. No. 5,020,209 to Fullard et al., on the other hand, discloses a belt lacing machine having a cutter blade apparatus for cutting the end of a belt and for clinching belt fasteners to the cut belt end. The belt is initially positioned and clamped in a cutting section of the machine. A carriage carries a blade that extends up through a longitudinal slot in the belt mounting surface and a drive handle is rotated to drive the carriage and blade to cut transversely across the belt end. The machine has mechanical, hook or C-shaped belt fasteners, and the cut belt end is then manually advanced further into the lacer machine and the fasteners are shifted to receive the cut belt end in their open jaws. Then the belt end is clamped, and the lacer rollers are driven along the belt end to clinch open legs of the fasteners closed and into the belt end. Another belt end must be prepared separately in the same manner. Once fasteners are separately secured to both belt ends, an operator removes the belt ends from the cutting and clinching machine for joining the belt ends together. For joining the belt ends, the operator must align the belt ends and interlace the belt fasteners of the two belt ends together. While maintaining the fasteners in an interlaced condition, the operator must carefully thread a splice pin through aligned openings of the fasteners to mechanically splice the belt ends together. While this process is useful for providing a straight cut and joining belt ends together, the Fullard machine is for installing a mechanical splice and requires a multiple step approach that includes rearranging and/or moving the belt ends several times during the procedure. The belt cutting area of the machine is different from where the fasteners are clinched onto the belt ends, which requires an increase in the over all size of the machine, and the belt ends are joined together outside the machine. In addition, an operator must premark the belt for cutting and then eyeball the belt to ensure that it is properly aligned in the machine so that the cut is made along the premark straight across the lateral width of the belt ends. It also requires the operator to separately prepare the belt ends in the machine and join them together after being removed from the machine, requiring additional time to join the belt ends together.

SUMMARY OF THE INVENTION

The present belt cutting and joining apparatus for joining two ends of one or more conveyor belts provides consistent cutting and joining of the ends of one or more conveyor belts, such as of a monolithic construction. Herein, it will be understood the term belt ends contemplates portions of a belt or belts at the ends thereof, and not just the end edges of the belt or belts. Further, the term monolithic conveyor belt includes conveyor belts that can include additional composite materials, such as Kevlar strands, in addition to the primary thermoplastic material from which they are typically formed.

In accordance with one aspect, a belt cutting and joining apparatus includes a frame assembly including a belt support for supporting the belt ends in spaced relation to each other, and an on-board cutting mechanism operatively mounted to the frame assembly for cutting an end portion of at least one of the conveyor belt ends with the one conveyor belt end supported on the belt support. The cutting mechanism is operable to remove at least a portion of belt material from the conveyor belt end to prepare the conveyor belt end for being joined to the other conveyor belt end. A splicing mechanism is provided for joining the cut belt end to the other belt end with the belts ends supported on the belt support. Advantageously, the conveyor belt can be both cut and joined with the belt mounted on the belt support using an on-board cutting device rather than requiring an operator to use a separate hand held utility knife to manually cut the belt ends. In one approach, the splicing mechanism is mounted to the frame assembly so that the operator is able to both cut and join the belt ends together using the same integrated splicing apparatus without requiring separate or additional equipment for the cutting and joining operations so that it is easier use and requires less time for joining the belt ends together.

In a preferred form, the belt support includes a pair of elongate platen devices and each platen device supports one of the conveyor belt ends thereon. The cutting mechanism includes a cutting device that is operable to travel in the longitudinal direction between the pair of elongate platen devices when the platen devices are in a belt cutting position. In one form, at least one of the platen devices includes an elongate bearing surface that the cutting device bears against as the cutting device travels in the longitudinal direction to guide the cutting device in the longitudinal direction to form a straight cut laterally across the conveyor belt end portion. In another form, the platen devices are spaced from each other in the cutting position to form a gap and a cutting blade extends up through the gap to cut the belt ends. In this manner, the belt ends are advantageously cut with the belt ends being positioned on the same platens on which the belts are positioned for joining the belts together to form a substantially square cut across the belt ends and for joining the belt ends together with the belt ends generally square to each other.

In another form, the cutting mechanism includes a cutting device that is operable to travel in a longitudinal direction across a lateral width of the one belt end. The belt support includes openings for receiving projections of the belt ends and the cutting device and an adjacent belt support opening are laterally spaced from each other by a predetermined distance. The predetermined distance is sized for maintaining a generally consistent pitch distance between adjacent projections of belt ends when the cut ends of one or more positive drive conveyor belts are joined together. Cutting the belt with the belt positioned so that its projections are received in the belt support openings also avoids tolerance stackup problems, because the same projection may be received in the same opening of the belt support during both the cutting and belt end joining operations. Preferably, the belt support includes a pair of elongate platen devices extending in the longitudinal direction each having grooves that extend in the longitudinal direction along belt support surfaces of the platens that receive belt end projections extending transversely across the belt ends. The cutting mechanism is operable to cut the one end portion of the belt to be generally parallel to the belt end projections so that the end portion is generally square to the lateral edges of the conveyor belt.

In accordance with another aspect, a conveyor belt welding apparatus is provided for joining together the ends of one or more monolithic conveyor belts. The conveyor belt welding apparatus includes a frame assembly and a pair of belt supports operatively mounted to the frame assembly for supporting conveyor belt ends to be joined together. The conveyor belt welding apparatus includes a non-contact heating device that is configured to be positioned between the conveyor belt ends for melting a portion of the belt material thereof for joining the conveyor belt ends together. A cutting mechanism is provided that includes a cutting device configured to travel in the longitudinal direction between and guided by the belt supports for cutting an end portion of one of the conveyor belts to remove at least a portion of belt material therefrom. In this manner, the conveyor belt welding apparatus both cuts and heats conveyor belt material between the conveyor belt supports with at least one of the conveyor belt ends supported by at least one of the belt supports so that the same support may be used for both cutting and heating of the conveyor belt. In addition, the cutting device is guided by the belt supports which avoids an additional guide component for this purpose. The use of the same belt supports for cutting and belt joining operations including guiding of the cutting device advantageously avoids having to move the belt around and reduces inaccurate cutting and heating due to improper or imprecise positioning of the belt ends during the cutting, heating, or joining operations and resultant tolerance stackup.

In one form, the heating device has an elongate configuration that extends in the longitudinal direction when it is positioned between the conveyor belt ends so that the heating device extends generally parallel to the at least one cut belt end portion. With this arrangement, the elongate heating device provides generally uniform heat across the lateral width of the one belt end portion.

In accordance with yet another aspect, a method is provided for cutting and joining together the ends of one or more conveyor belts. The method includes supporting one of a pair of conveyor belt ends on one of a pair adjacent belt supports driving a cutting device between the belt supports to remove belt material from the one conveyor belt end with the one conveyor belt end supported on the one belt support and guiding the cutting device with the belt supports as the cutting device is driven therebetween. The method further includes disposing a heating member between the belt supports with the belt ends supported thereon to melt belt material of the conveyor belt ends, and moving at least one of the belt ends toward the other belt end to join the belt ends together.

In one form, the method includes disposing drive bars of the supported conveyor belt end within grooves of a platen device. The method also includes driving the cutting device in the longitudinal direction across the lateral width of the supported conveyor belt end to square the end thereof. The method further includes positioning the heating device between the belt ends to extend in the longitudinal direction so that the elongate heating device uniformly heats the conveyor belt ends across the lateral widths thereof.

BRIEF DESCRIPTION OF THE DRAWINGS

FIG. 5 is an enlarged perspective view of an end portion of the apparatus showing the belt cutting mechanism advanced out of its home position into a gap between the platen devices;

DETAILED DESCRIPTION OF THE PREFERRED EMBODIMENTS

Figure 1:
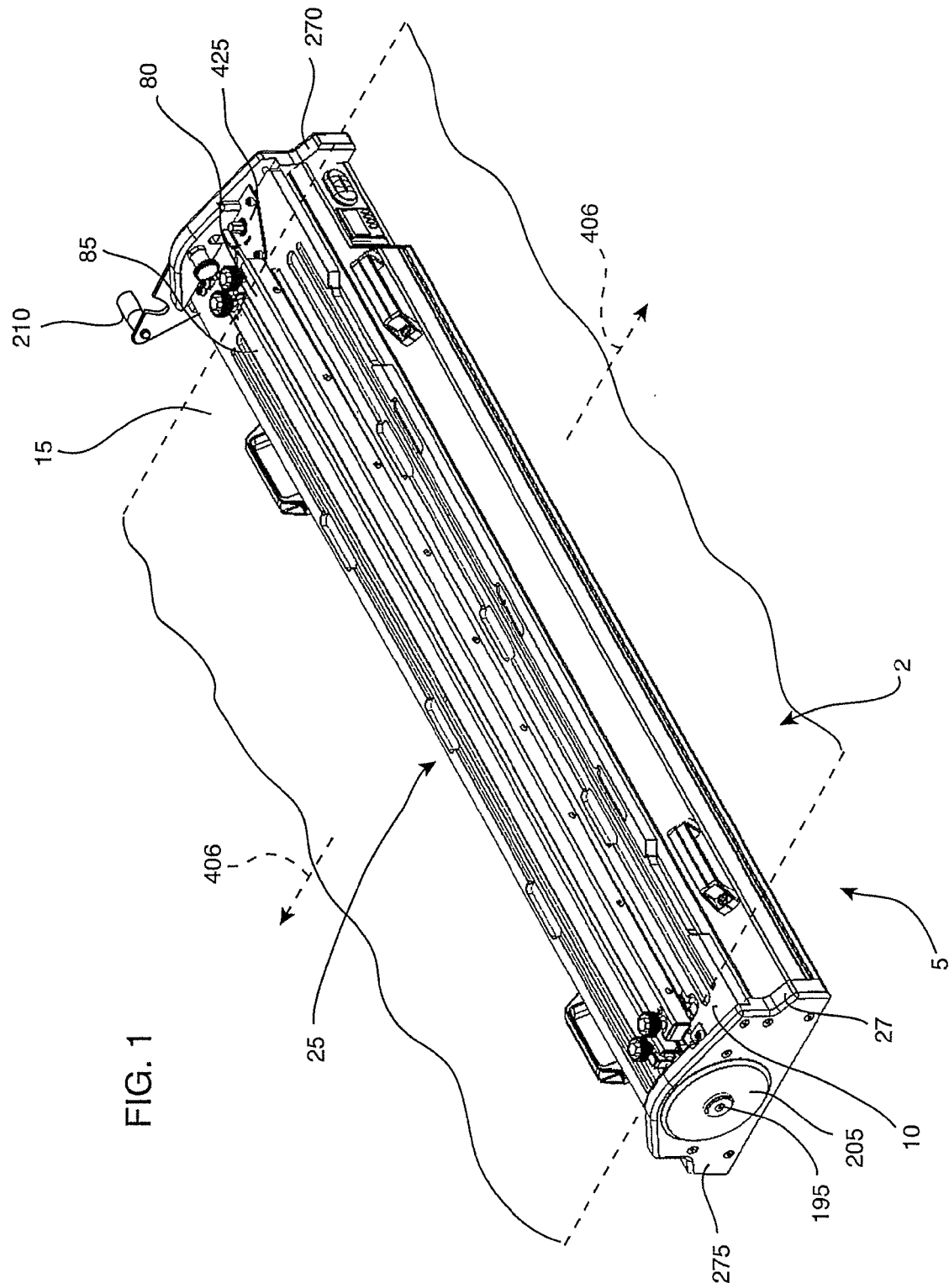
FIG. 1 is a perspective view of a conveyor belt cutting and splicing apparatus in accordance with the present invention showing an on-board belt cutting mechanism in a home position at one end of the apparatus.

In FIG. 1, a conveyor belt cutting and splicing apparatus 5 is illustrated for cutting and joining together the ends 10 and 15 of one or more conveyor belts 2, for example, of an endless type conveyor belt. The conveyor belt splicing apparatus 5 may be used to join the conveyor belt ends together on the conveyor belt system or at a remote location therefrom. The conveyor belt splicing apparatus 5 includes a belt support 25 mounted to a frame assembly 27 for supporting the belt ends 10 and 15 generally adjacent to one another. A cutting mechanism 30 (FIG. 6) is provided for cutting the belt ends 10 and 15. The cutting mechanism 30 advantageously is operatively mounted to the frame assembly 27 for cutting the conveyor belt ends while they are supported by the belt support 25, without requiring the use of a separate hand-held utility knife for this purpose. The conveyor belt cutting and splicing apparatus 5 also includes a splicing mechanism 40 (FIG. 3) for joining the belt ends 10 and 15 together as they are supported by the belt support 25. In this manner, the present apparatus 5 allows an operator to both cut and splice belt ends 10 and 15 together without the need for additional or separate equipment for either of these operations.

As illustrated, the splicing mechanism 40 of the conveyor belt cutting and splicing apparatus 5 herein preferably includes a heating device 55 for being disposed between the belt ends 10 and 15 for melting a portion of the material thereof. The illustrated belt support 25 includes a pair of belt supports in the form of elongate platen devices 60 and 65 extending side-by-side in a lengthwise direction across the lateral width of the belt ends 10 and 15 for supporting the belt ends 10 and 15 thereon. The platen device 65 is movable laterally with respect to the other platen device 60 for moving the belt end thereon toward and away from the other belt end on the fixed platen device 60. Alternatively, platen device 60 could be movable while platen device 65 is fixed, or both platen devices 60 and 65 could be movable.

Figure 2:
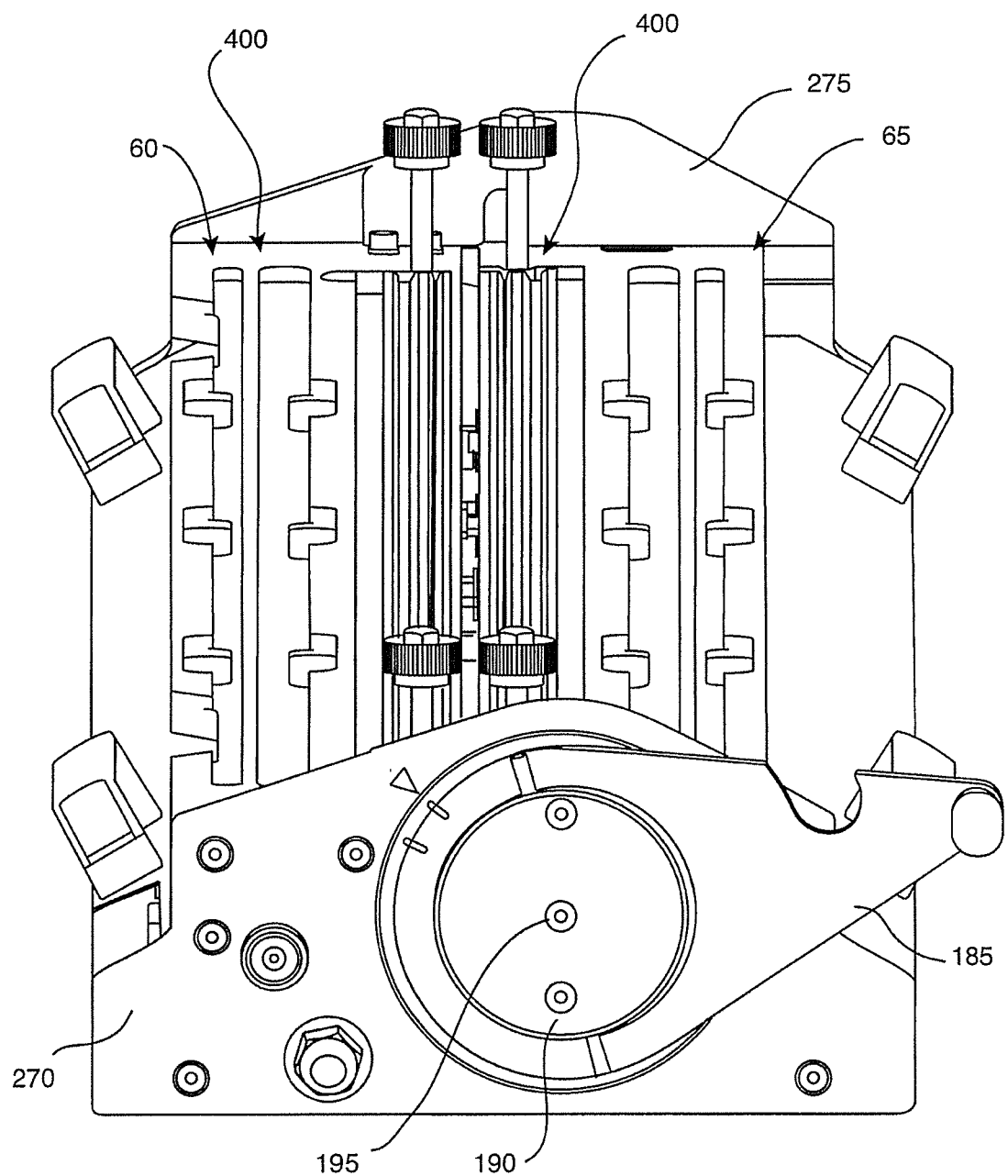
FIG. 2 is an end perspective view of the apparatus of FIG. 1 showing a lever actuator positioned so that a pair of platen devices are shifted to a belt cutting/loading position.

The elongate platen devices 60 and 65, and particularly upper surfaces 70 and 75 thereof, are arranged and configured to be substantially horizontal and coplanar with one another with the frame assembly 27 supported on a flat, horizontal surface. In this respect, the conveyor belt ends 10 and 15 can be supported on the upper surfaces 70 and 75 of the platen devices 60 and 65 when the platen devices 60 and 65 are in a belt loading position 160, illustrated in FIGS. 1 and 2, such that the belt ends 10 and 15 are positioned generally in end-to-end abutting relationship thereon. As will be discussed further, the belt loading position 160 is also advantageously used for operation of the cutting mechanism 30 so that it also functions as a belt cutting position and hereinafter is referred to as the belt cutting/loading position 160. With the belt ends 10 and 15 supported on the upper surfaces 70 and 75 of the platen devices 60 and 65, clamping members in the form of clamp bars 80 and 85 are provided for clamping the belt ends 10 and 15 down against the platen upper surfaces 70 and 75.

Figure 2A:
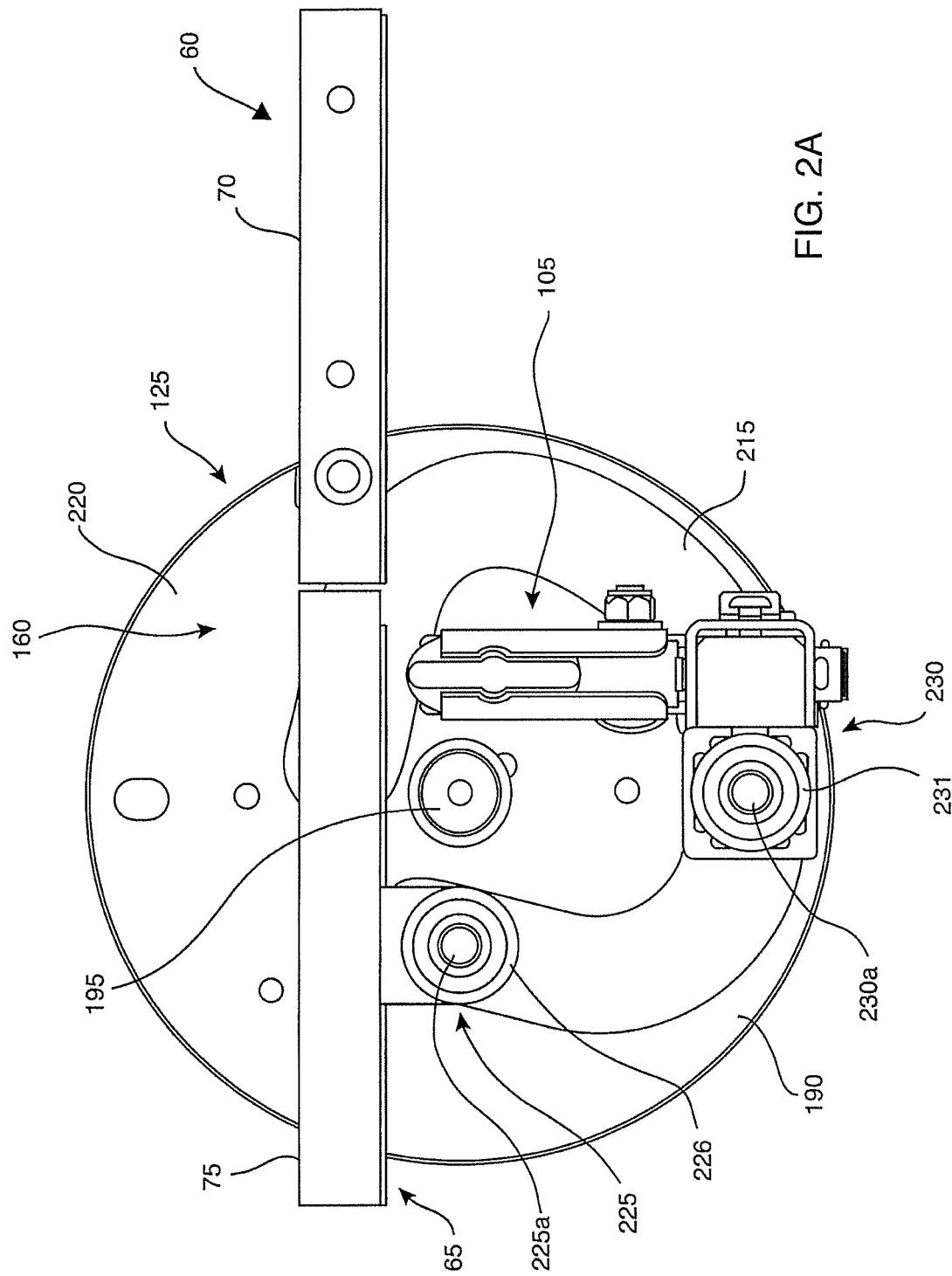
FIG. 2A is an end elevational view of the platen devices, a heating device, cam followers for the heating device and a movable one of the platen devices showing the positions of the cam followers in a cam track of the cam disc with the lever actuator positioned in the belt cutting/loading position.
Figure 3:
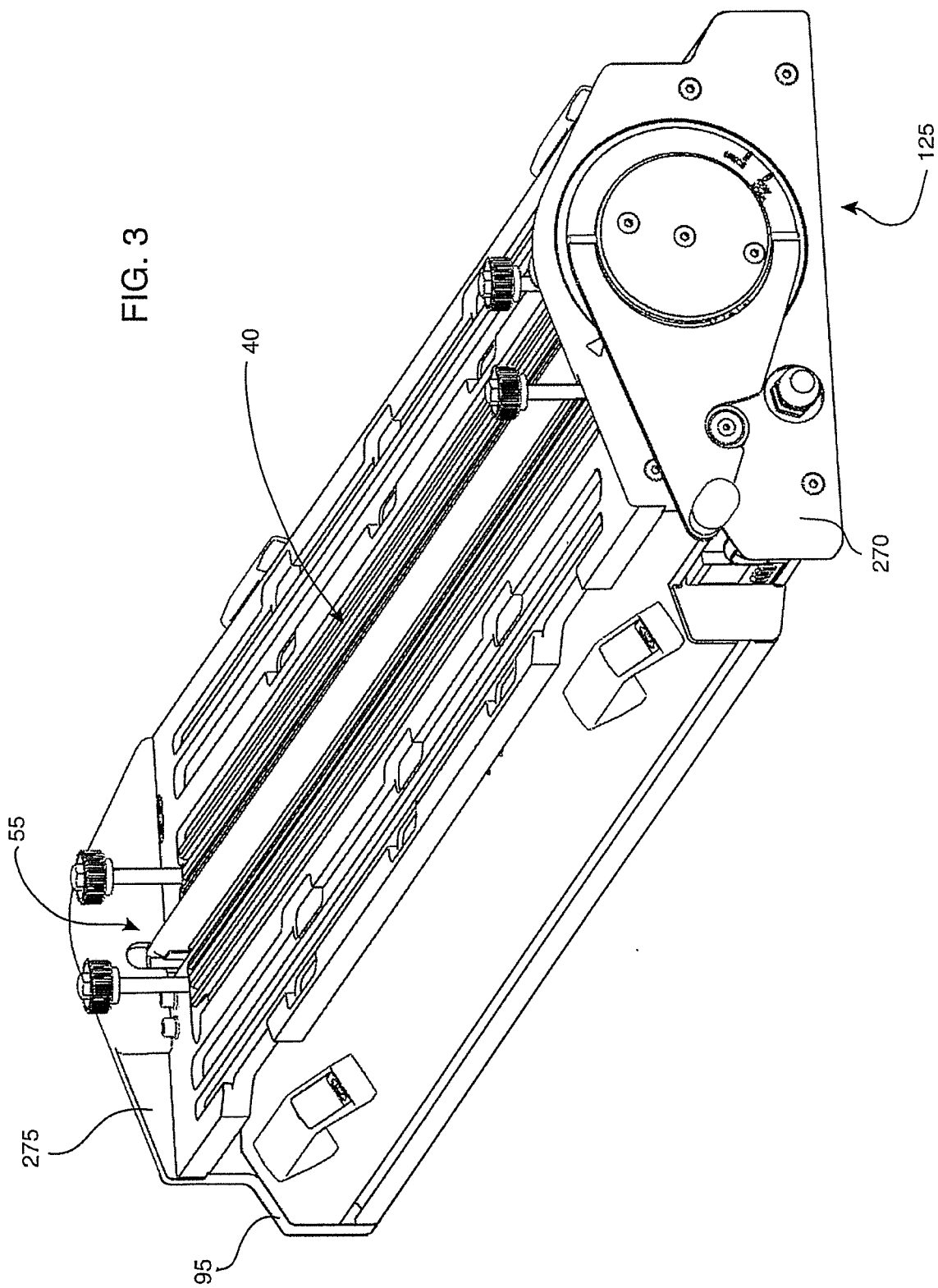
FIG. 3 is a perspective view of the apparatus of FIG. 1 showing the lever actuator positioned so that the platen devices are shifted to a belt heating position with the heating device in a raised, heating position between the platen devices.

Referring to FIG. 3, the heating device 55 has an elongate configuration and is arranged to extend in the lengthwise direction of the apparatus 5. The elongate heating device 55 preferably is movably mounted at each end thereof in a generally enclosed frame housing 95 formed by the frame assembly 27 between a raised heating position 100 (FIG. 3A), wherein the heating device 55 is disposed between the conveyor belt ends 10 and 15 and a lowered inoperative, stowed position 105 (FIGS. 2A and 4A), wherein the heating device 55 is removed from between the conveyor belt ends 10 and 15 so that the belt ends 10 and 15 can be moved toward each other without interference from the heating device 55. A separate heating device could also be employed but the heating device 55 herein mounted to the frame assembly 27 so as to be on-board the apparatus 5 is preferred. As can be seen, the heating device 55 in the stowed position 105 is positioned vertically below the platen devices 60 and 65 so that the platen devices 60 and 65 extend over and substantially cover the heating device 55 in the housing 95. In the heating position 100 with the platen devices 60 and 65 laterally spaced apart to enlarge longitudinally extending gap 115 therebetween for providing clearance for the heating device 55 therein, the heating device 55 is vertically raised to position it to extend in the gap 115 and to be generally horizontally aligned with the belt ends 10 and 15. In this manner, the heating device 55 can be used to provide heat to the conveyor belt ends 10 and 15 to melt a portion of the material thereof. Melting of the belt material is used herein to refer to sufficient heating of the material so that the material is softened and capable of forming a weld splice between the conveyor belt ends 10 and 15.

Although contact heating devices are also contemplated, it is preferred that the heating device 55 be of a non-contact type such that when in its raised, operative heating position 100, the heating device 55 is laterally offset from the belt ends 10 and 15 by a predetermined distance to provide an air gap therebetween. The air gap is precisely sized to allow adequate thermal radiation emitted from the preferred infrared heating device 55 to transfer between the heating device 55 and the belt ends 10 and 15 to adequately heat and melt the belt material but to avoid overheating or burning of the melted belt material. In this regard, precise positioning of the heater device 55 relative to the platen devices 60 and 65 and the belt ends 10 and 15 thereon is controlled with operation of a drive mechanism 125 for the platen devices 60 and 65 and heating device 55 described in more detail hereinafter. So configured, during heating, the belt ends 10 and 15 do not contact the non-contact heating device 55 and instead the non-contact heating device 55 emits thermal radiation across the air gap to heat and melt the belt ends 10 and 15, thus avoiding the loss of belt material therefrom that may otherwise occur due to melted belt material sticking to a contact-type heating device.

As previously mentioned, the on-board cutting mechanism 30 is provided for cutting and removing at least a portion of belt material from the belt ends 10 and 15 so that they are precisely squared for being properly heated and joined together. It has been found that previous approaches requiring an operator to utilize a hand-held utility knife and/or a separate cutting template to cut and square the belt ends can result in problems with the quality of the cut belt end 10, such as due to variations in the amount of material removed. It should be noted that variations of removed belt material along the belt ends 10 and 15 on the order of 1 mm or even less can have a significant affect on the quality of the weld splice formed therebetween.

Referring to FIGS. 5-9, the cutting mechanism 30 includes a cutting device 130 that is configured to travel in a generally straight travel path along the longitudinal direction 150 between the platen devices 60 and 65 so that the cutting device 130 cuts belt material from either belt end 10 or belt end 15 across a lateral width thereof. The cutting device 130 includes a blade holder or carriage 135 that is operatively mounted to the frame assembly 27. For this purpose, the carriage 135 is preferably slidably mounted to the fixed platen device 60 for sliding longitudinally therealong with the platen device 60 fixedly mounted to the frame assembly 27, and specifically end plates 270 and 275 thereof. The carriage 135 holds a cutting member in the form of cutting blade 140, which extends upwardly from the carriage 135 for cutting either belt end 10 or 15 supported by the corresponding platen device 60 or 65 in the belt cutting/loading position 160 thereof with the material of the belt ends 10 or 15 to be cut extending over the gap 115 between the platen devices 60 and 65 and above the carriage 135. In one example, the blade 140 is a commercially available blade such as a curved Stanley blade.

The platen device 60 has a generally S-shaped bracket 142 secured to the underside 63 thereof adjacent to an inner edge surface 325 of the platen device 60 to support the cutting device carriage 135 for sliding therealong. More specifically, the bracket 142 has a channel portion 145 sized for receiving the carriage 135 so that the carriage 135 can travel in and along the channel 145 in the longitudinal direction 150 adjacent to the platen devices 60 and 65. Alternatively, the channel 145 may be formed integrally with the fixed platen device 60. As shown best in FIGS. 7 and 9, the bracket 142 has a generally U-shaped inner side portion 146 having a bottom wall 147 extending laterally inwardly to an upturned lip portion 148 to form the upwardly open channel 145 for receiving the carriage 135, which rides along and within the channel 145 in the longitudinal direction 150. More particularly, the blade holder or carriage 135 has a body 135a that is connected to a drive mechanism 310 of the cutting mechanism 30, and specifically to a toothed drive belt 345 thereof.

Because of the significant space constraints for the cutting mechanism 30 in the housing 95 and particularly for the carriage body 135a, conventional approaches for attachment to the belt 345 are undesirable since these typically fasten clamping plates together above and below the belt to clamp the belt therebetween. Instead, the carriage body 135a includes an inner blade holder portion 136 on the flat side 345a of the belt 345 and a clamp member 137 on the toothed side 345b of the belt 345. The member 137 has a complementary toothed configuration for mating with the belt toothed side 345b. As can be seen best in FIGS. 8 and 9, the clamp member 137 fits into the bracket channel 145 under the platen device 60 and is secured to the blade holder portion 136 so that the channel bottom wall 147 is spaced slightly below the member 137. In addition, since the clamp member 137 is located in a space constricted area under the platen device 60, the member 137 is sized so that its vertical height is approximately the same as that of the drive belt 345. To secure the blade holder body 135a to the belt 345, a through opening 346 is formed in the belt 345 aligned with a threaded opening 138 formed in the blade holder portion 136 and a counter sunk through opening 137a formed in the clamp member 137 for receiving a threaded fastener 139 therein. In this manner, the blade holder body 135a does not need space above and below the belt 345 on its inner toothed side 345b for being fixedly secured thereto.

The blade holder portion 136 of the carriage body 135a has slot opening 136a in which the cutting blade 140 is tightly received with the curved, leading cutting edge 140a projecting out therefrom. As illustrated, the blade holder portion 136 includes a supported member 141 and a blade capture member 143 secured together as by fasteners. The supported member 141 has a recess 144 for receiving the blade 140 which is captured in the recess 144 when the blade capture member 143 is fastened thereto to form the blade slot opening 136a out from which the blade cutting edge 140a upwardly projects.

The supported member 141 has a side track portion 141a which is configured to cooperate with the platen device 60 and the bracket 142 for guiding and supporting the carriage 135 for its longitudinal travel during belt cutting operations. The side track portion 141a includes an upwardly facing channel or track 141b into which extends a depending lip portion 61 formed at the inner end of the platen device 60, so that the depending lip portion 61 is captured therein to provide precision guiding of the blade carriage 135 as it is shifted longitudinally along the platen device 60, and specifically along the inner edge bearing surface 325 thereof. The side track portion 141a further includes a downwardly facing channel or track 141c into which the end lip portion 148 of the bracket 142 fits for providing support to the blade carriage 135, and particularly the blade holder portion 136 thereof cantilevered from the lip portion 148.

The side track portion 141a further includes a laterally extending neck portion 141d having an inverted L-shaped portion 141e at its end. The portion 141e includes a vertical portion 141f that projects upwardly and downwardly along the belt flat side 345a and beyond the neck portion 141d to extend along the respective upper and lower channels 141d and 141c, and an upper, horizontal guide flange portion 141g disposed at the top of the leg portion 141f and projecting laterally away therefrom and lengthwise alongside the upper channel 141d. The upper guide flange portion 141g is sized to fit into a corresponding downwardly facing track groove 62 formed in the bottom surface 63 of the platen device 60 to provide for further precision for the guided sliding movement of the blade carriage 135 during belt cutting operations. The lower end portion 141h of the vertical portion 141f is sized to extend downwardly beyond the clamp member 137 (FIG. 8) for engaging and being supported by the channel bottom wall 147. The lower end portion 141h slides on the channel bottom wall 147 as the carriage 135 is driven for longitudinal travel.

Figure 3A:
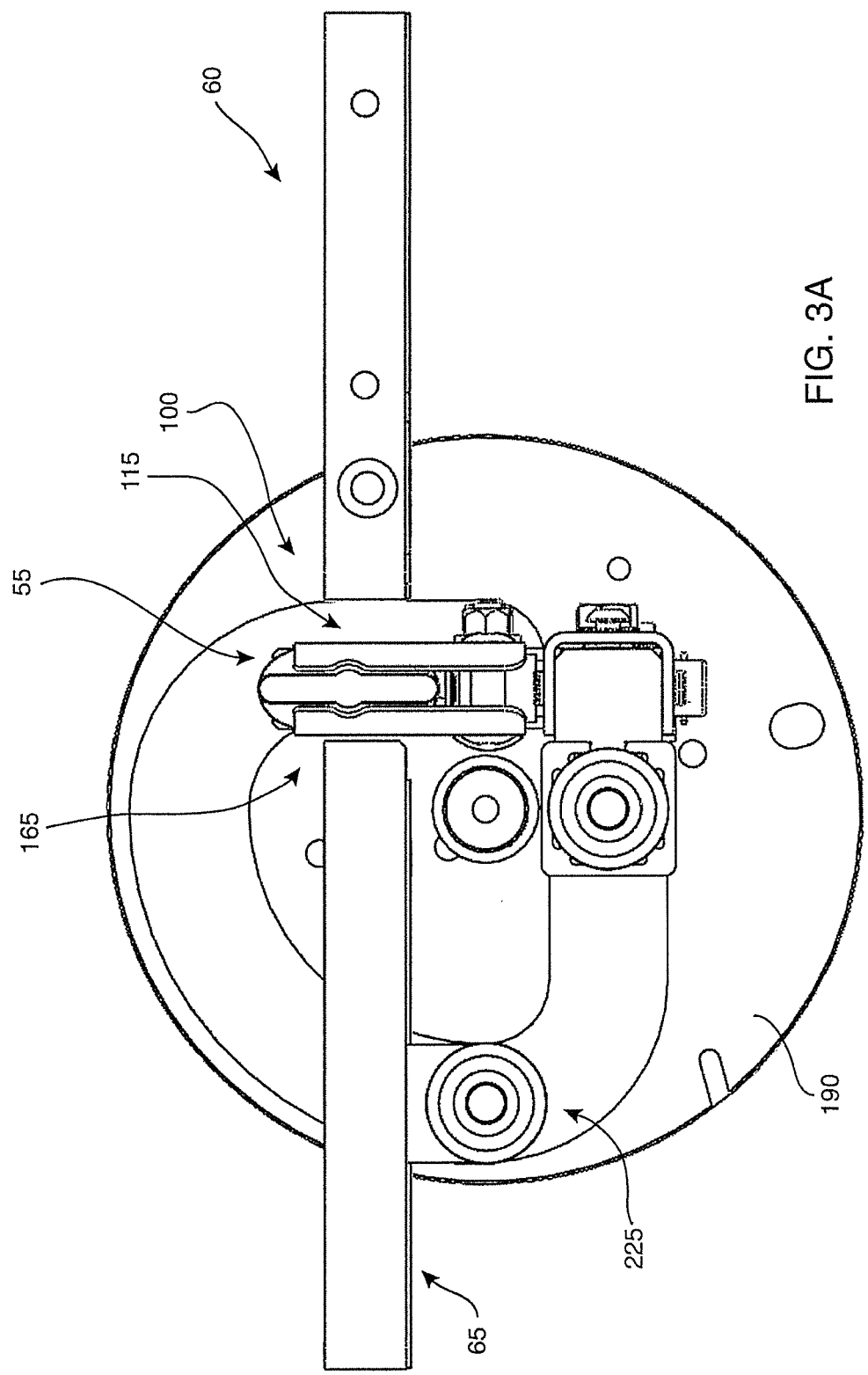
FIG. 3A is an end elevational view similar to FIG. 2A except showing the positions of the cam followers in the cam track with the lever actuator positioned in the belt heating position.
Figure 4:
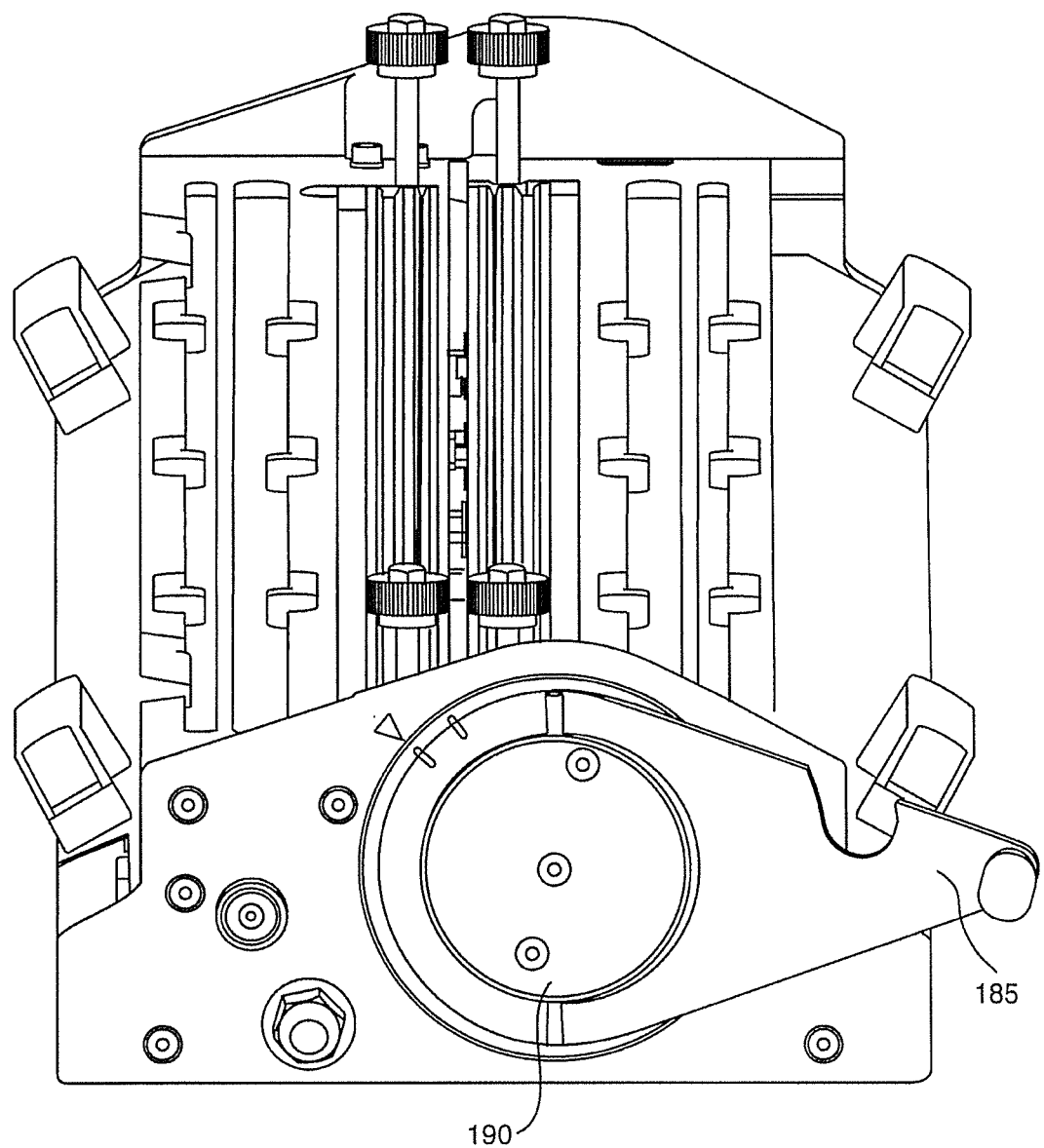
FIG. 4 is a end perspective view of the apparatus of FIG. 1 showing the lever actuator positioned so that the platen devices are shifted to a belt joining position.
Figure 4A:
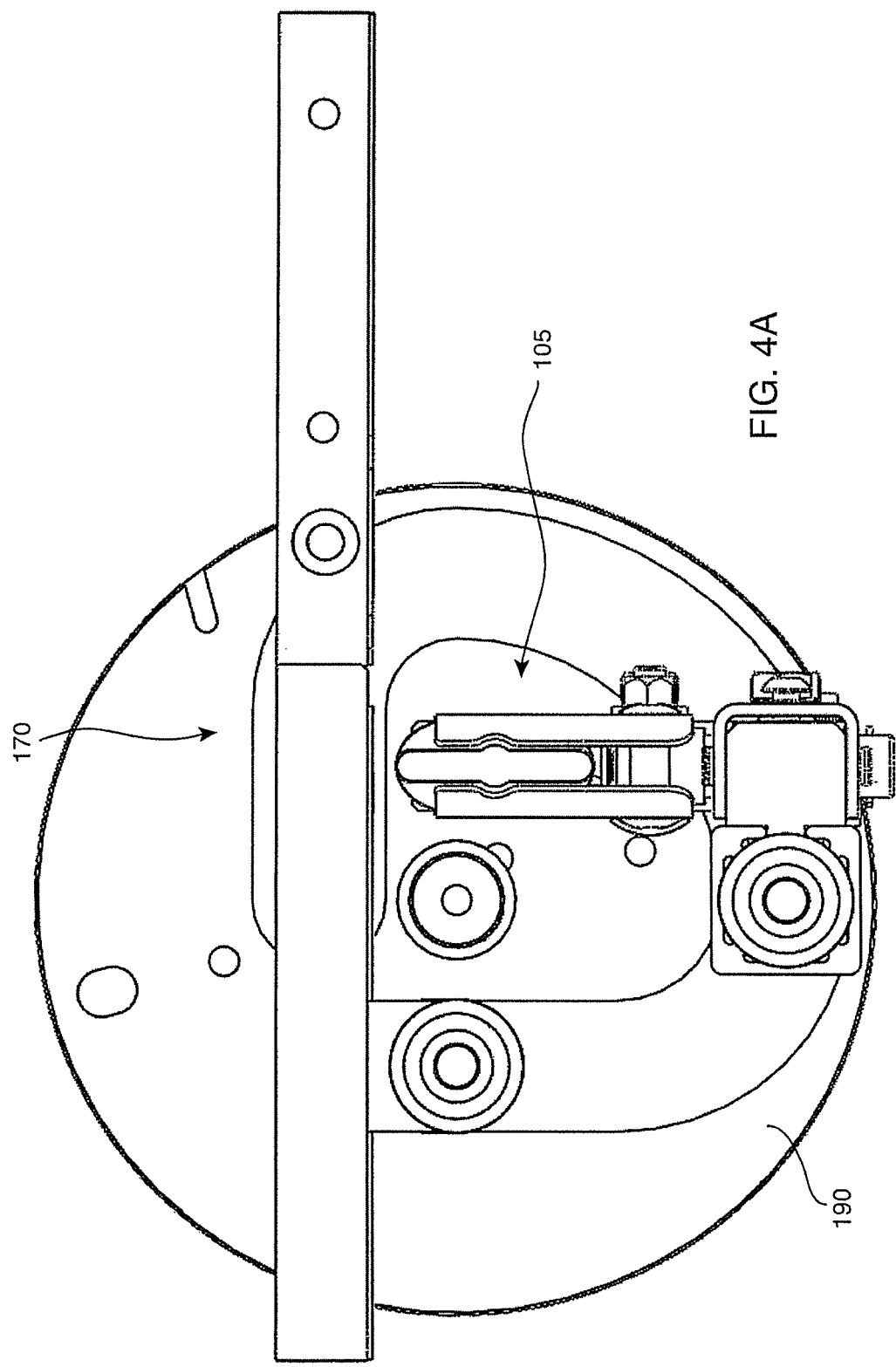
FIG. 4A is an elevational view similar to FIGS. 2A and 3A except showing the positions of the cam followers in the cam track with the lever actuator positioned in the belt joining position.

The platen devices 60 and 65 are also movable between different positions relative to each other, including the belt cutting/loading position 160 (FIG. 2A) a belt heating or melting position 165 (FIG. 3A), and a belt joining position 170 (FIG. 4A). In the belt cutting/loading position 160, the belt ends 10 and 15 are both cut so as to be squared by the on-board cutting mechanism 35 so that after the belt ends 10 and 15 are cut and loaded onto the platen devices 60 and 65 in the belt cutting/loading position 160, the belt ends 10 and 15 generally abut one another. In the belt heating or melting position 165, the platen devices 60 and 65 are spaced further apart so that the heating device 55 can be fit therebetween for melting the belt material of the belt ends 10 and 15. The carriage 135 will not separate and fall from its mounting when the platen devices 60 and 65 are shifted apart to the belt heating position 165 because of the capture of the bracket lip portion 148 in the blade holder track 141c, the platen depending lip portion 61 in the blade holder track 141b, and the blade holder upper guide flange portion 141g in the platen track groove 62.

In the belt joining position 170, the platen devices 60 and 65 are positioned laterally closer to each other than in the belt cutting/loading position 160 so that the gap 115 therebetween is smaller than in the cutting position 160 by a predetermined amount or lateral distance. In this manner, when the platen devices 60 and 65 are moved to the joining position 170, the belt ends 10 and 15 are clashed together to overlap by a predetermined distance beyond their original end-to-end abutting arrangement so that the softened belt material thereof will intermix. As mentioned, the cut belt ends 10 and 15 are preferably in end-to-end abutment in the belt cutting/loading position 160, so that the distance the platen devices 60 and 65 move toward one another from their lateral spacing in the belt cutting/loading position 160 to the belt joining position 170 is equal to the belt overlap or clash. It is also contemplated that the cut belt ends 10 and 15 may be spaced in the cutting/loading position 160 so that the amount of overlap is less than the amount the belt ends 10 and 15 are shifted toward each other. For example, the predetermined amount of belt overlap may be between about 0.5 mm and about 2 mm. In practice, the predetermined amount of overlap is about 1.0 mm, and the lateral spacing across the platen gap 115 is 8 mm in the belt cutting/loading position 160, and the lateral spacing across the platen gap 115 is reduced to 7 mm in the belt joining position 170. Thus, after heating of the belt ends 10 and 15 to sufficiently melt the material, the melted material in the belt ends 10 and 15 intermixes so that upon cooling and hardening of the material, the belt ends 10 and 15 become fused to one another to form a weld splice therebetween and their combined length is reduced by the predetermined overlap amount.

As is apparent, the 8 mm size for the lateral gap 115 between the platen devices 60 and 65 in the cutting/loading position 160 is very limited, as well as is the space in the housing 95 due to the presence of the vertically moveable heating device 55 and its associated electronics therein. However, the on-board cutting device 130 is configured to utilize this tight space for achieving a precision square cut of the belt ends 10 and 15 without requiring that separate guide templates, or cutting blades or knives, be available and used properly by an operator. In this regard, the carriage body 135a and specifically the blade holder portion 136 thereof has an upwardly extending narrow guided body portion 136b formed by the connected members 141 and 143. The narrow guided body portion 136b is sized to fit into the gap 115 with the platen devices 60 and 65 in the cutting/loading position 160 with outer, flat bearing surfaces 315 and 320 thereof bearing against corresponding end edge bearing surfaces 325 and 330 of the platen devices 60 and 65.

Thus, as the carriage 135 travels in the longitudinal direction 150 between the platen devices 60 and 65, the carriage 135 will travel above the heating device 55 in its lowered position and the carriage outer bearing surfaces 315 and 320 can bear against the platen inner bearing surfaces 325 and 330 to guide the carriage 135 in a straight travel path in the longitudinal direction 150. For this purpose, the carriage outer bearing surfaces 315 and 320 and the platen inner bearing surfaces 325 and 330 are preferably coated with and/or formed of a low friction, abrasion resistant material to allow the carriage 135 to slide smoothly between the platen devices 60 and 65 for limiting abrasion of the bearing surfaces. Similarly, since the carriage lower end portion 141h slides in the channel bottom wall 147, preferably the end portion 141h and channel bottom wall 147 are coated with and/or formed of a low friction abrasion resistant material for smooth sliding of the end portion 141h on the bracket wall 147. More preferably, since the sliding bearing surfaces of the carriage 135 are all on the blade holder portion 136 including members 141 and 143 thereof, these components can be entirely coated with and/or formed of a low friction, abrasion resistant material. For example, the blade holder members 141 and 143 can be of hardened steel coated with a low friction polymer material. The platen devices 60 and 65, and specifically the respective platen members 66 and 67 thereof, and the bracket 142 can be of treated aluminum material with a low friction polymer coating thereon.

The carriage guided body portion 136b has a width between the outer surfaces 315 and 320 that is approximately equal or slightly less than the width of the platen gap 115 formed between the platen devices 60 and 65 in the cutting/loading position 160 thereof. This allows the carriage outer bearing surfaces 315 and 320 to bear against the platen inner surfaces 325 and 330 to keep the carriage body portion 136b, and specifically the cutting blade 140 projecting upwardly therefrom, substantially centered in the gap 115 between the platen bearing surfaces 325 and 330 as it travels in the longitudinal direction 150 to provide a precision square cut of the belt ends 10 and 15. In practice, with the lateral width of the gap 115 set at 8 mm in the belt cutting/loading position 160, the carriage width between the surfaces 315 and 320 thereof is about 7.8 mm. In addition, the blade slot opening 136a is centered between the surfaces 315 and 320 and is preferably sized so that the width across the slot opening 136a is substantially the same as or slightly greater than the width of the blade body 140b, e.g. 0.025 inches, so that the blade body 140b is snugly received in the slot opening 136a with a clearance fit therein between the fastened together blade holder members 141 and 143. A set screw extending through aligned openings of the blade body 140b and blade holder members 141 and 143 removably secures the blade 140 in the slot opening 136a.

The drive mechanism 125 is operable for driving the movable platen device 65 toward and away from the fixed or stationary platen device 60 to move the platen devices 60 and 65 relative to each other between the different operation positions 160, 165 and 170 thereof. The drive mechanism 125 is also operable for shifting the heating device 55 between the raised heating position 100 and the lowered stowed position 105, as previously mentioned. The heating device 55 is in its lowered, stowed position when the platen devices 60 and 65 are shifted to be in the belt cutting/loading and belt joining positions, 160 and 170, thereof, and is shifted to its raised position with the platen devices 60 and 65 shifted to be in the belt heating position 165 thereof. The drive mechanism can be a cam drive mechanism 125 for driving both the movable platen 65 and the heating device 55 between their different operation positions 160, 165 and 170. The cam drive mechanism 125 includes a lever actuator 185 secured to a rotatable cam disc 190 that is, in turn, secured to a connecting shaft 195. The shaft 195 extends longitudinally across the apparatus 5 in the housing 95 thereof and is secured to a generally mirror image, second rotatable cam disc 205 at the opposite longitudinal end thereof so that the shaft 195 causes the second rotatable cam disc 205 to rotate to the same extent as the first cam disc 190 when the lever actuator 185 is operated. Thus, upon rotation of the lever actuator 185 using a handle 210 extending therefrom, the cam discs 190 and 205 are rotated by substantially similar angles through rotation of the connecting shaft 195.

The cam discs 190 and 205 each include identical cam paths formed in their inner surfaces with cam path 215 in inner surface 220 of cam disc 190 illustrated (FIGS. 2A, 3A, and 4A). The cam path 215 is programmed or configured to generate lateral movement of the movable platen 65 and vertical movement of the heating device 55 as the lever 185 is rotated in substantially the same manner as disclosed in the previously discussed '801 publication. The platen device 65 includes a movable mount in the form of a pair of movable platen cam follower assemblies 225, one of which is shown, mounted respectively at each longitudinal end of the platen device 65. The heating device 55 likewise includes a moveable mount in the form of a pair of heating device cam follower assemblies 230, one of which is shown, mounted respectively at each longitudinal end of the elongate heating device 55. Roller members 226 and 231 of the cam follower assemblies 225 and 230 are disposed in the cutout cam path 215 so that rotation of the cam discs 190 and 205 urges the cam follower rollers 226 and 231 to shift along the cam path 215, which in turn shifts the movable platen 65 and the heating device 55 to move along their respective predetermined lateral and vertical paths. The movement of the platen device 65 and heating device 55 to predetermined operative positions is advantageously controlled by the operation of a single actuator 185 by an operator. For this purpose, the end plates 270 and 275 of the frame assembly 27 are configured to allow for the guide shafts 225a and 230a of the respective cam assemblies 225 and 230 to extend therethough via lateral and vertical through slots of the plates 270 and 275, and to support and guide the platen device 65 and the heating device 55 for their respective lateral and vertical movements via laterally and vertically extending recessed channels in the plates 270 and 275 as disclosed in the '801 publication.

Figure 6:
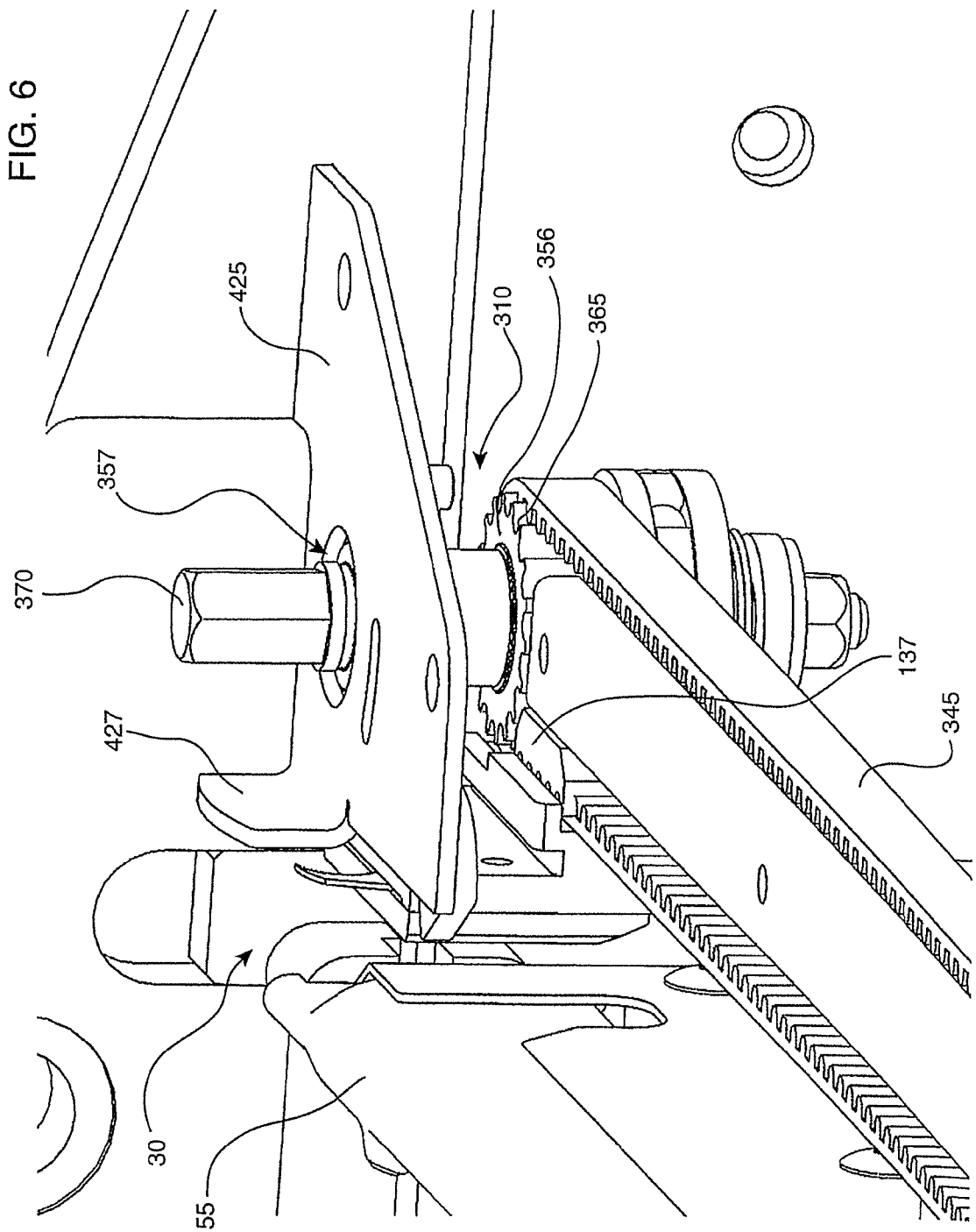
FIG. 6 is an end perspective view of the apparatus with the platen devices removed to show a cutting device of the cutting mechanism including a blade holder and blade, a drive mechanism of the cutting mechanism including a drive belt to which the blade holder is connected and a drive shaft and drive pulley for the drive belt.
Figure 6A:
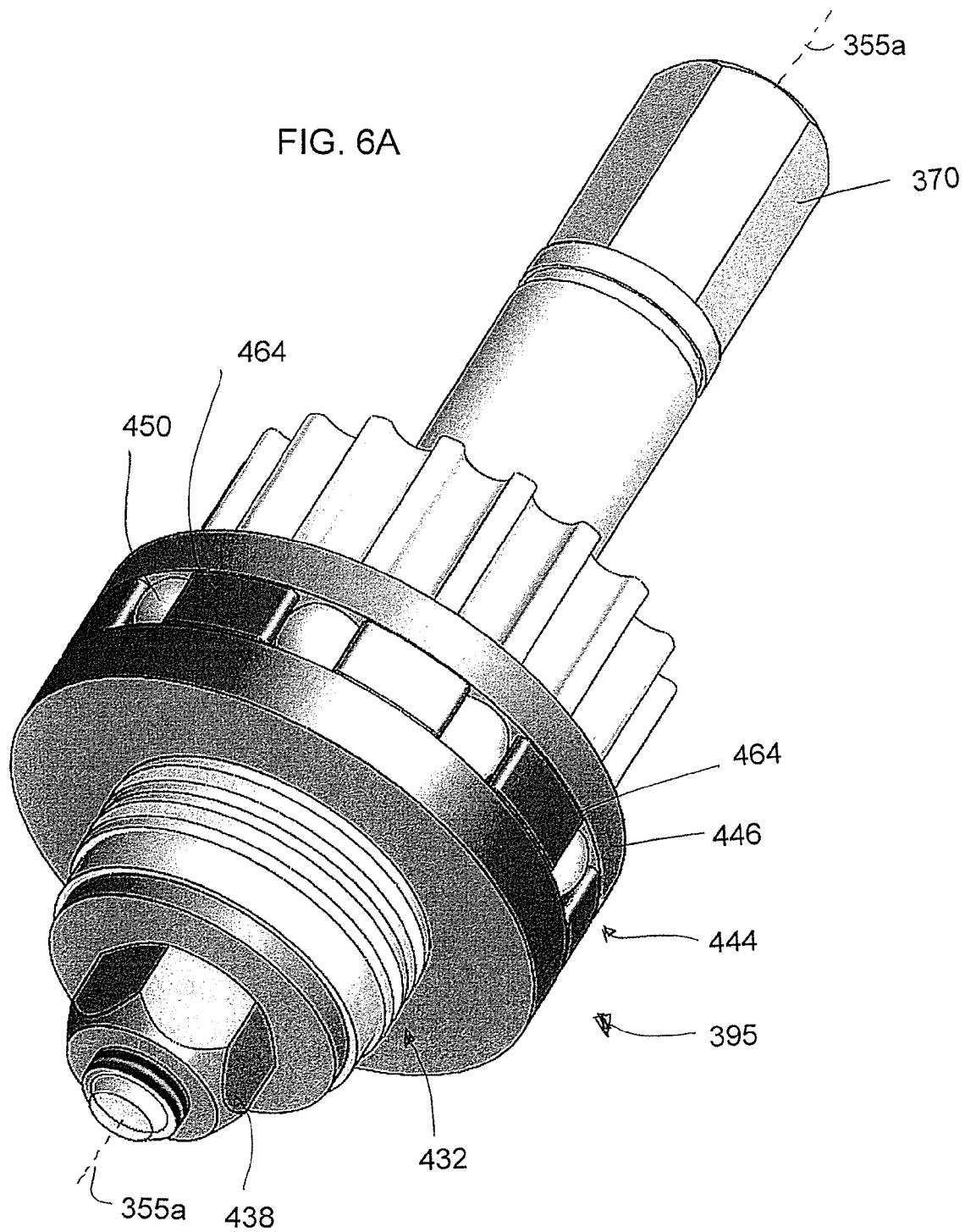
FIGS. 6A and 6B are perspective views of a torque limiting device for the cutting device drive mechanism.
Figure 6B:
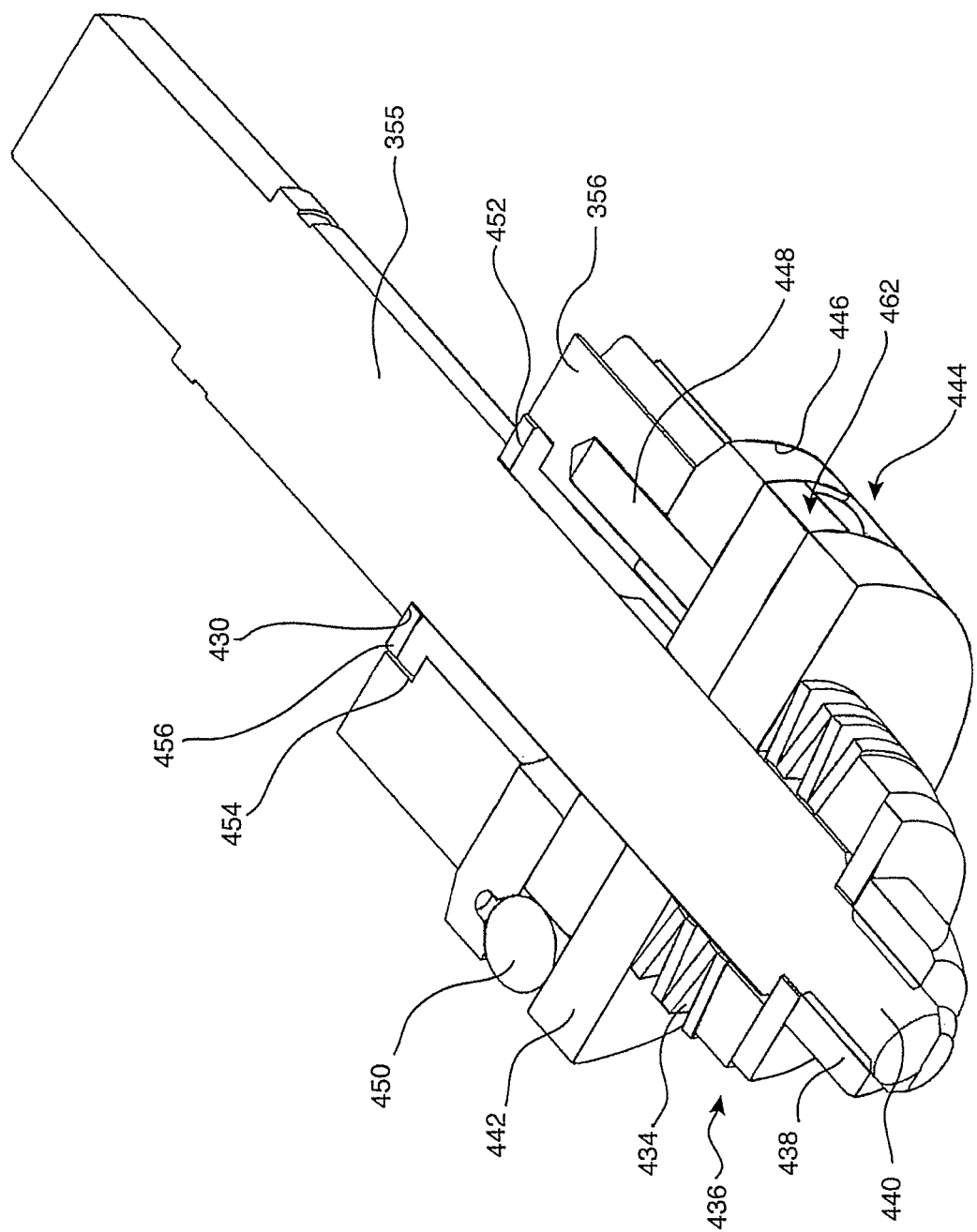
Figure 6C:
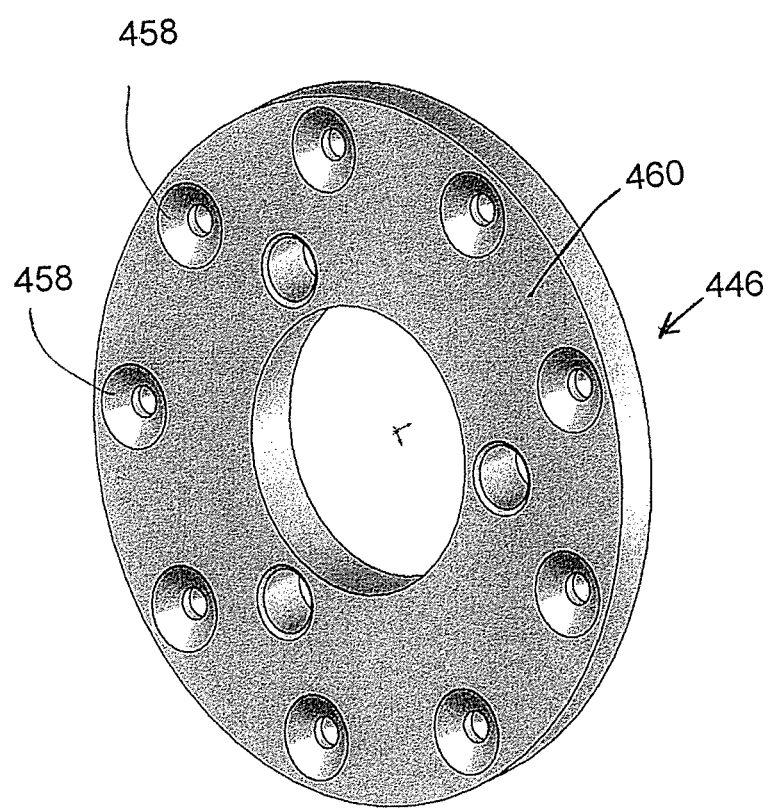
FIG. 6C is a perspective view of a pulley flange member of the torque limiting device of FIGS. 6A and 6B.
Figure 7:
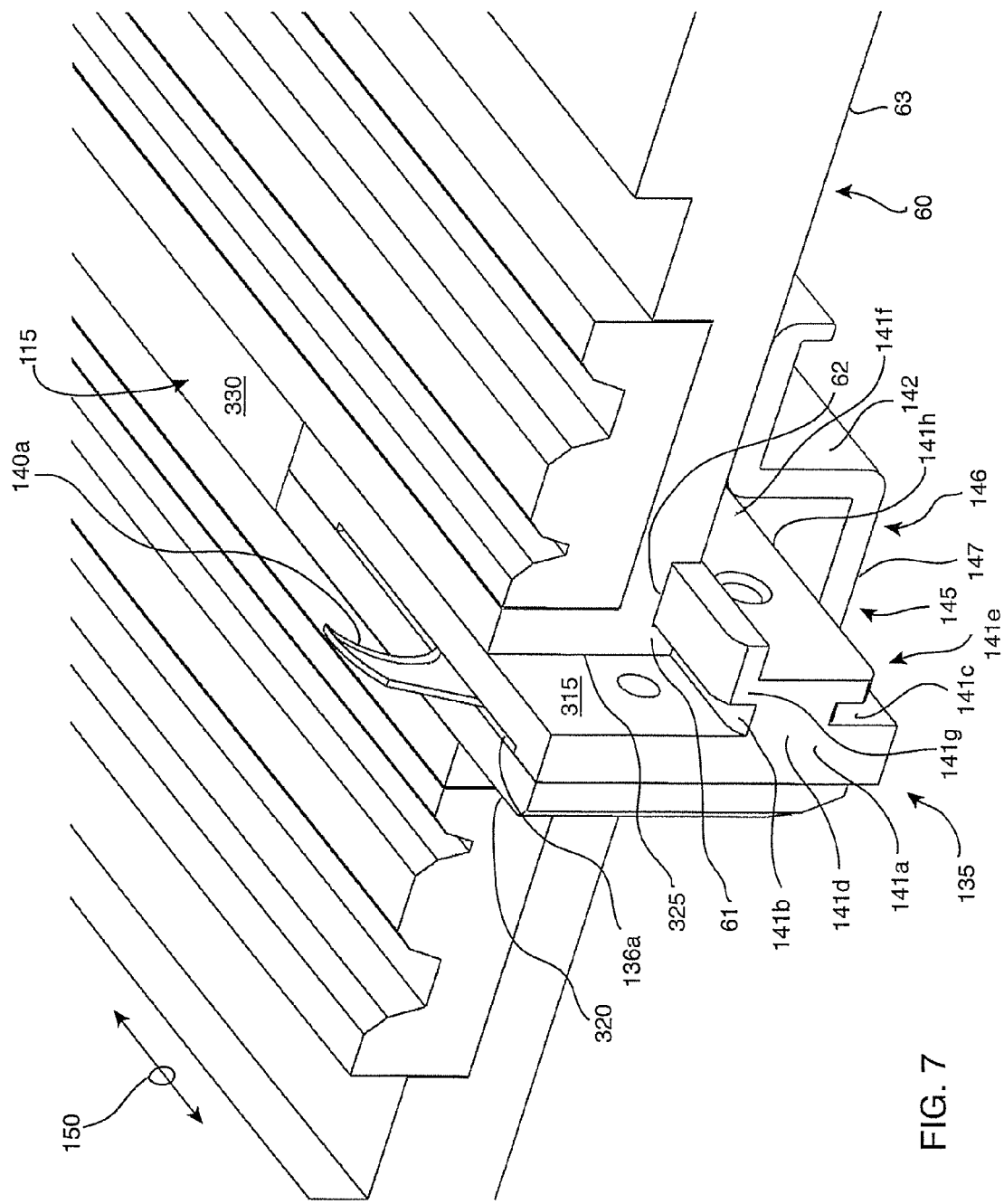
FIG. 7 is a perspective view of the platen devices in the belt cutting/loading position showing a guide member fixed to one of the platen devices for supporting the blade holder in a support channel thereof.
Figure 8:
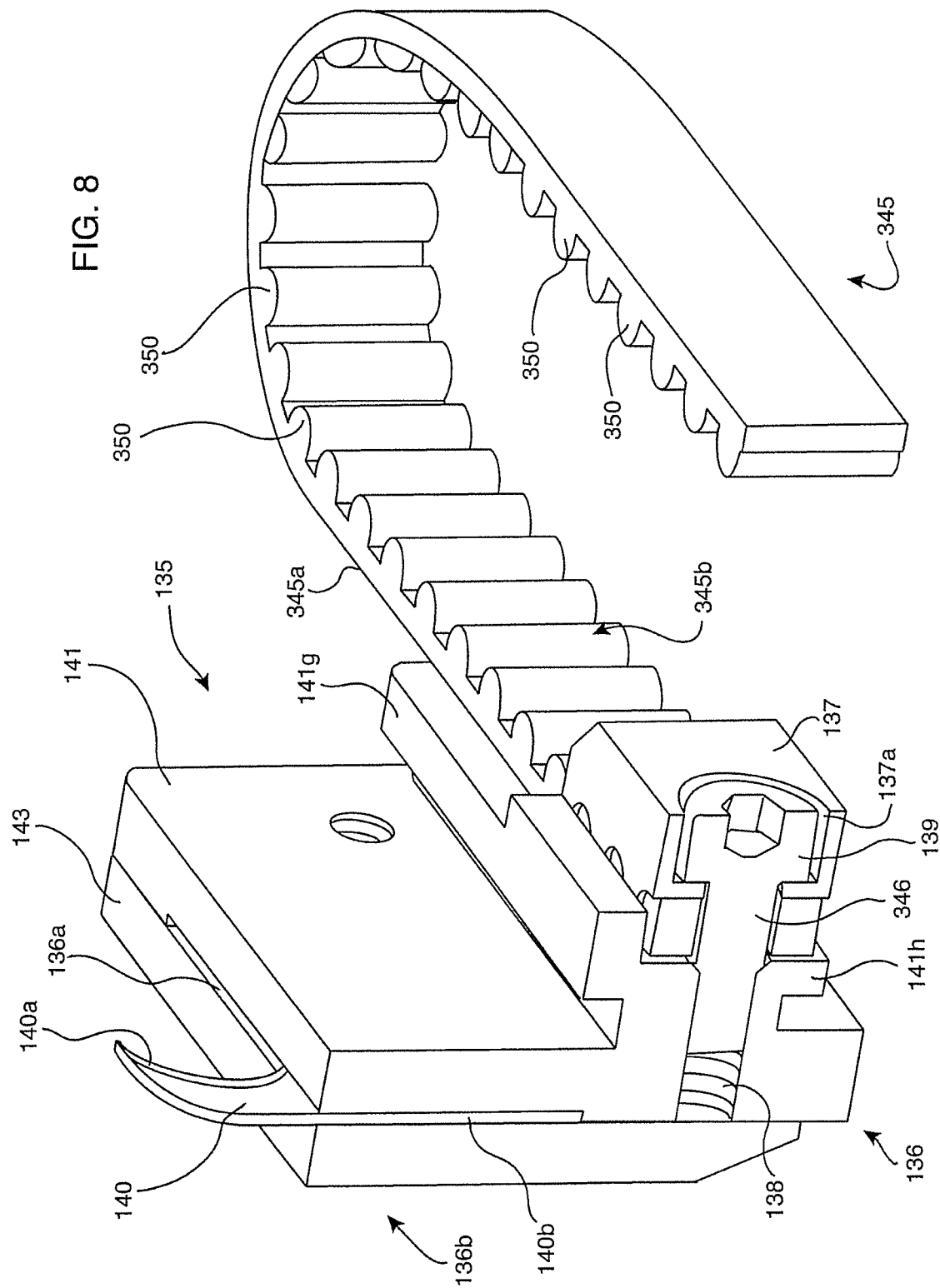
FIG. 8 is a fragmentary, perspective sectional view showing the blade holder connected to the drive belt with a clamp member, and a fastener extending through the belt.
Figure 9:
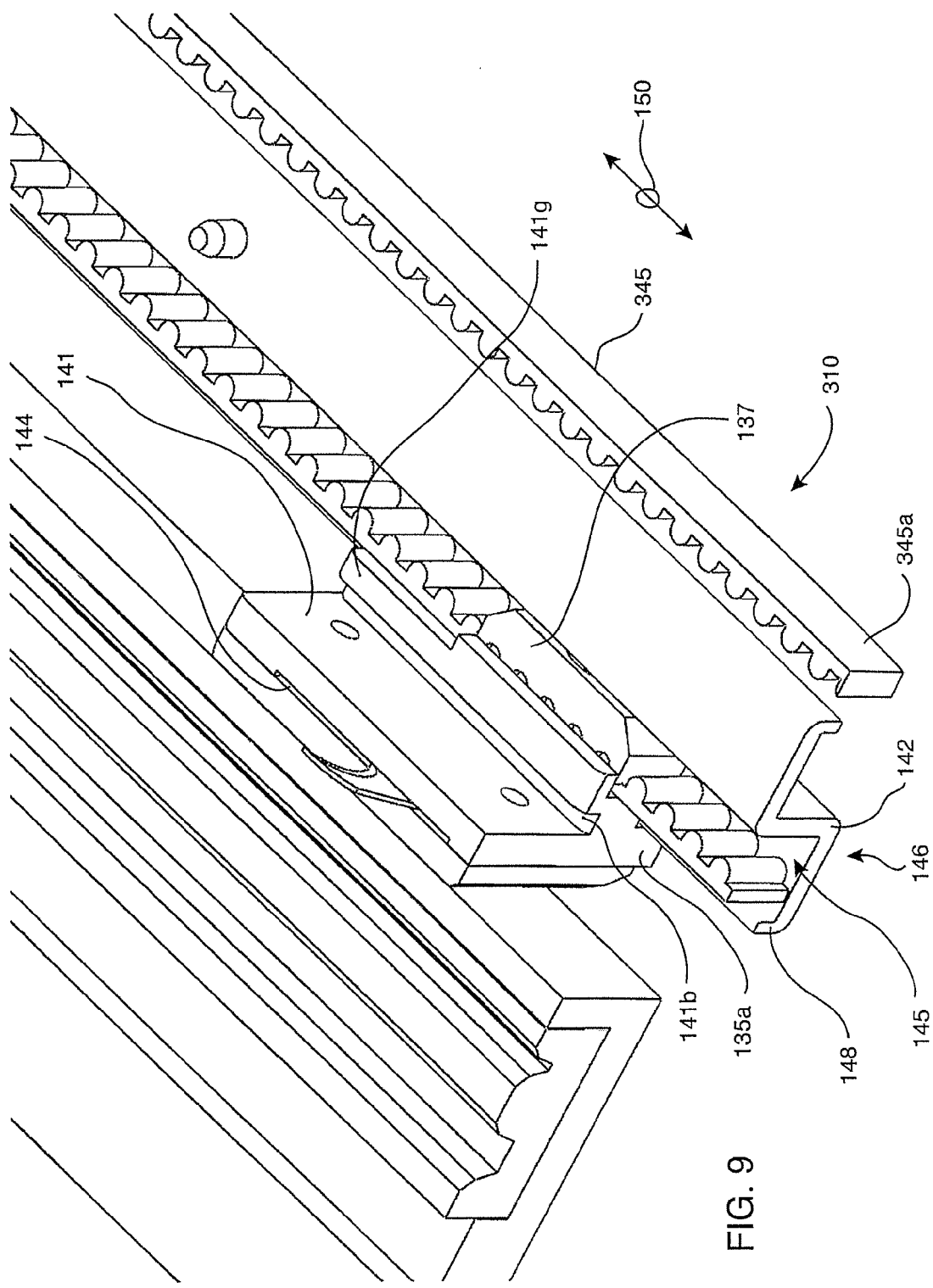
FIG. 9 is a perspective view similar to FIG. 7 with the platen device that is fixed to the guide being removed and showing the drive belt and clamp member received in the support channel.

The cutting device drive mechanism 310 is operable for driving the carriage 135 of the on-board cutting device 130 in the longitudinal direction 150 so that an operator is not required to manually draw a blade across the belt ends 10 or 15 loaded on the apparatus 5. Referring to FIG. 6, the drive mechanism 310 includes the positive drive endless drive belt 345 arranged so that its teeth 350 project inwardly therefrom. Drive shaft 355 has a drive pulley 356 coupled thereto so that pulley teeth 365 thereof intermesh with the belt teeth 350. At the other end of the apparatus 5, the belt 345 meshes with an idler pulley (not shown). The drive shaft 355 extends through a through opening 357 formed in the platen device 60, including latch plate 505 and cover plate 425, which will be described more fully hereinafter. A shaft actuator head 370 at the upper end of the drive shaft 355 projects upwardly above the cover plate 425. As shown, the shaft head 370 has a keyed or hex configuration. In this regard, a separate tool, such as a socket wrench, may be attached to the hex head 370 to rotate the shaft 355. Rotation of the drive shaft 355 causes the drive belt 345 to travel longitudinally within the channel 145 for driving the carriage 135 with the blade 140 moving longitudinally in the gap 115 for cutting one of the conveyor belt ends 10 and 15 extending across the gap 115.

As shown in FIGS. 6 and 6A-6C, the drive mechanism 310 includes a torque limiter mechanism 395 that allows for rotation of the drive shaft 355 without generating rotation of the drive pulley 356 and driving of the belt 345 and carriage 135 fixed thereto if the cutting device 130 encounters a predetermined amount of resistance during travel thereof. The torque limiter mechanism 395 is operable to bias the pulley 356 against shoulder surface 430 of drive shaft 355 extending generally orthogonal to shaft axis 355a via biasing mechanism 432. As illustrated, the biasing mechanism 432 can be a disc spring such as a plurality of Belleville washer springs 434 mounted at its lower end on washer or washers 436 supported on nut 438 threaded to the distal 440 of the drive shaft 355. The axial bias force provided by the springs 434 is transferred to the pulley 356 via annular pressure plate 442 mounted to the upper end of the spring 434 and configured to extend about the shaft 355 in clearance therewith for axial movement thereon. A ball bearing device 444 is mounted on shaft 355 between the pressure plate 442 and annular pulley flange member 446.

The annular pulley flange member 446 is also configured for sliding along shaft 355 and is fixed to the bottom of the pulley 356 as by an axial dowel pin 448 pressed into aligned openings of the pulley 356 of the flange member 446 so that the axial bias forces from the spring 434 are transmitted to the pulley flange member 446 and the pulley 356 fixed thereto via ball bearings 450 of the ball bearing device 444. The flange member 446 is radially enlarged relative to the pulley 356 to support the drive belt 345 as it extends about the pulley 356 to keep the belt teeth 350 intermeshed with the pulley teeth 365.

The pulley 356 has a headed or flanged bushing 452 pressing into a correspondingly configured through opening 454 therein with the bushing 452 being operable to take the axial spring load generated by the disc spring 434. As shown, a load bearing washer 456 is disposed between the bushing 452 and the shaft shoulder 430 which is pressed tightly thereagainst by the bias force from the spring 434.

So that the pulley 356 will normally rotate with the shaft 355 during operation of the cutting device drive mechanism 310, the pulley flange member 446 is provided with cup recesses 458 formed in the bottom surface 460 thereof spaced equally about its circumferential periphery for receiving the ball bearings 450 therein. Torque generated by turning of the shaft 355 is transferred to cage member 462 of the ball bearing device 444 since the cage member 462 is fixed to the shaft 355. The cage member 462 transfers the torque to the ball bearings 450, and then as long as the ball bearings 450 remain biased upwardly in their recesses 458, torque will be transferred to the flange member 446 and pulley 356 fixed thereto. Should loading on the pulley 356 become excessive, the ball bearings 450 will be forced out of their recesses 458 to ride on the flange member bottom surface 460 causing axial downward translation of the pressure plate 442 thus compressing the spring 434 and no longer transferring torque to the flange member 446 sufficient to rotate the pulley 356 thereby allowing the shaft 355 to rotate relative to the pulley 356 so that cutting device 130 is no longer driven in the longitudinal direction 150. The cage member 462 of the ball bearing device 444 has divider wall portions 464 extending radially between adjacent ball bearings 450 that will repeatedly direct the ball bearings 456 to the adjacent recess 458 in the flange member 446 until the overloading or overtorquing condition ceases. At this time, the ball bearings 450 will each seat in a recess 458 and the torque from the shaft 355 will be transmitted to the pulley 356, as described above.

To prepare conveyor belt ends 10 and 15 prior to splicing them together, one of the conveyor belt ends 10 is first supported on the upper surfaces of the belt support. Typically, both belt ends will be cut prior to joining the belt ends together so that the belt ends are properly cut and square relative to one another so that the conveyor belt ends 10 and 15 align when they are joined together. While the conveyor belt ends 10 and 15 can be cut in any order, the process will be described with respect to cutting conveyor belt end 10 before conveyor belt end 15. To cut the conveyor belt end 10, the belt end is supported on the platen device 60. More particularly, with platen devices 60 and 65 in the belt cutting/loading position 160, the belt end 10 is supported on platen device 60 with a portion thereof extending over the gap 115. This end overhang portion of the belt end 10 may extend onto the opposite platen device 65 to provide additional support for the belt end 10 during cutting thereof. The apparatus 5 may also include structure for properly aligning the belt end 10 relative to the cutting device 130 so that a square cut of the belt end 10 is generated. As described further below, the structure may include longitudinally extending openings preferably in the form of grooves 400 in the platen upper surfaces 70 and 75 for receiving drive bars 405 of a positive drive conveyor belt 2, which extend laterally across the belt so that the cutting device 130 cuts orthogonally across the lateral width of the belt end 10 as the device 130 travels in the longitudinal direction 150.

While the illustrated cutting device 130 is shown with a single cutting blade 140 so that the cutting device 130 can only cut the belt ends while traveling one way in the longitudinal direction 150, a double edged blade or a separate, oppositely facing blade may be provided to allow cutting of the belt ends 10 and 15 with the cutting device 130 traveling both ways in the longitudinal direction 150.

Figure 12:
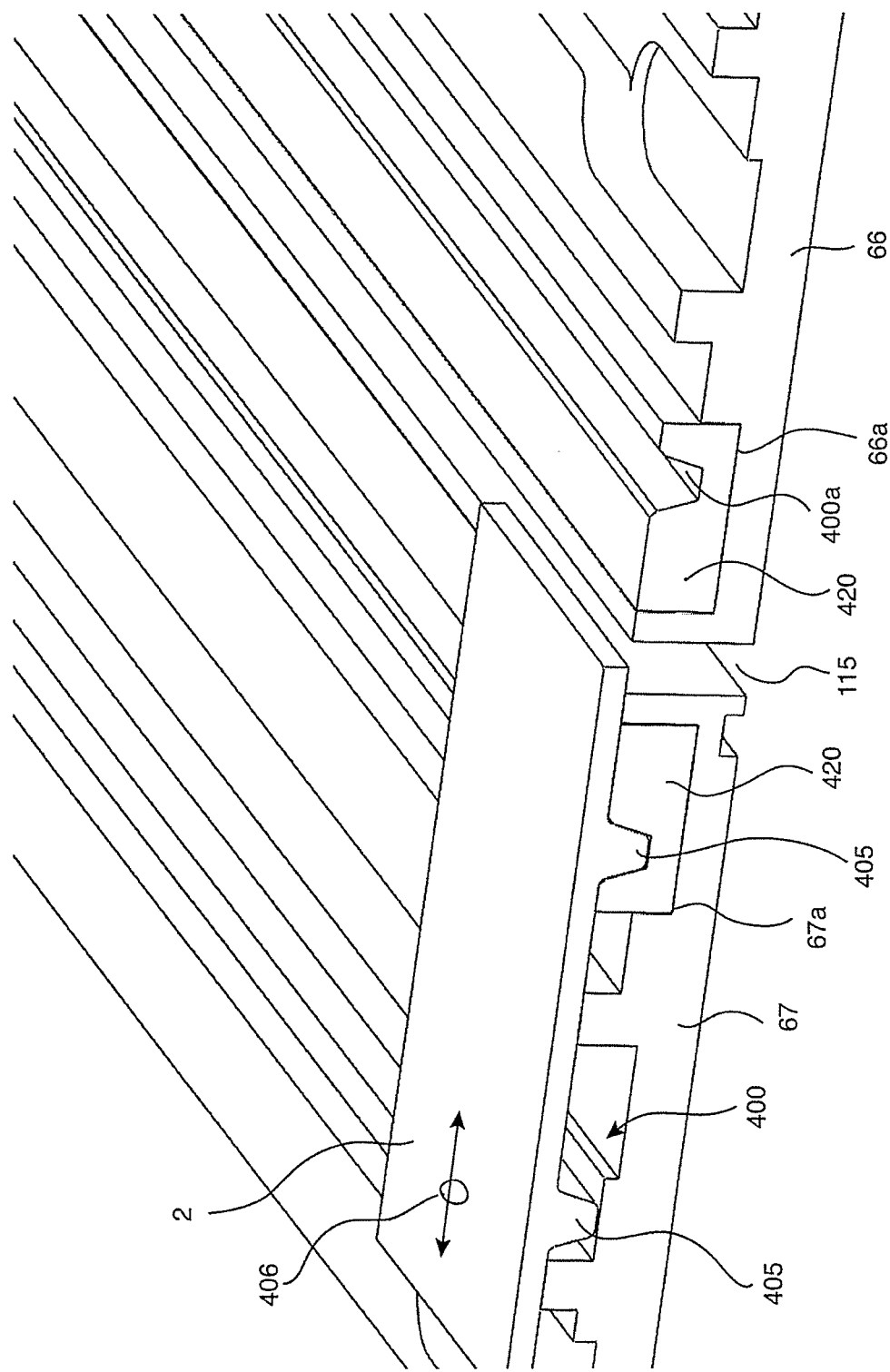
FIGS. 12-15 are perspective views of the platen devices including platen members and strip inserts received in grooves of the platen members adjacent the gap between the platen members with different inserts having grooves that are configured to snugly receive drive bars of different conveyor belts therein.

The cutting device 130 herein includes a single blade 140 with a single cutting edge 140a thereof so that the blade 140 can only cut the belt as it travels one way in the longitudinal travel direction. Thus, prior to cutting the belt end 10, the cutting device 130 is moved from a home position 410 (FIG. 10) thereof along its straight longitudinal travel path at one end of the apparatus 5 to the opposite end of the apparatus 5. The belt end 10 is then loaded onto the platen device 60 to be supported thereby with at least a portion thereof extending above and across the platen gap 115 and onto the other platen device 65. The belt end 10 is then secured to the platen device 60 by the clamp bar 80 to restrict movement during cutting thereof. Since the groove 400a of the platen device 60 that matingly or snugly receives a drive bar 405 therein (see, e.g., drive bars 405a and 405b snugly received in respective grooves 400a closest to gap 115 shown in FIGS. 12 and 14, and drive bar 405a snugly received in groove 400a adjacent to but not closest to gap 115 shown in FIG. 13) will not be spaced from the corresponding groove 400a of the platen device 65 a distance equal to the pitch or between the belt drive bars 405 when the devices 60 and 65 are in the cutting/loading position 160, the drive bar 405 on the platen device 65 will be slightly misaligned with the corresponding groove 400a of the platen device 65. Thus, the clamp bar 85 is to remain unclamped during belt cutting operations on belt end 10 so that the clamp bar 85 is not trying to force the drive bar 405 down into the misaligned groove 400a of platen device 65 potentially causing the drive bar 405 to be pulled out of or misaligned from its tight mating fit in the groove 400a of platen device 60 in which it is clamped. The actuator head 370 is then turned with a tool to drive the cutting device 130 in the longitudinal direction 150 back toward the home position 410. In this regard, the operator uses a tool to rotate the drive shaft 355 to move the drive belt 345 for driving the cutting device 130 in the longitudinal direction 150. The carriage guided portion 136b travels between and is guided by the platen devices 60 and 65 in the longitudinal direction 150 with the blade 140 projecting upwardly therefrom to cut through the belt and remove a portion of the belt material from the conveyor belt end 10.

After the first conveyor belt end 10 is prepared, if necessary, the second conveyor belt end 15 can be cut in a similar manner by supporting the conveyor belt end 15 on the platen device 65 so that an end portion thereof extends over the gap 115 between the platen devices 60 and 65 and thereacross to be also supported on the platen device 60. Before aligning and clamping the belt end 15 on the platen device 65, the actuator head 370 is again turned to move the cutting device 130 to the opposite end of the apparatus 5. With the belt end 15 clamped, the actuator head 370 is turned to drive the carriage 135 and blade 140 in the longitudinal direction 150 back toward the home position 410 to cut and remove belt material from the second belt end 15.

With the cutting device 130 in its home position 410 and after both belt ends 10 and 15 have been cut, the first cut belt end 10 can be loaded back on the platen device 60, aligned with the other belt end 15, and clamped to the platen device 60. In this regard, the cut belt end 10 will have the same drive bar 405 placed into the platen device groove 400a that is configured for snug or tight receipt thereof as was therein during cutting of the belt end 10. Further, the second belt end 15 does not have to be moved and instead can simply stay clamped to the platen device 65 after it is cut. Since the conveyor belt ends 10 and 15 were both precision cut with the same cutting blade 140 traveling in the gap 115, the conveyor belt ends should abut in end-to-end engagement, with both belt ends 10 and 15 being generally square. The conveyor belt cutting and splicing apparatus 5 can then be operated to heat and weld the belt ends 10 and 15 together in a manner substantially as described in the '801 publication. Thus, both belt ends 10 and 15 are cut and welded together with the respective same drive bars 405 remaining in the adjacent grooves 400a of the platen devices 60 and 65 avoiding tolerance stack-up problems created with the use of prior devices.

Figure 10:
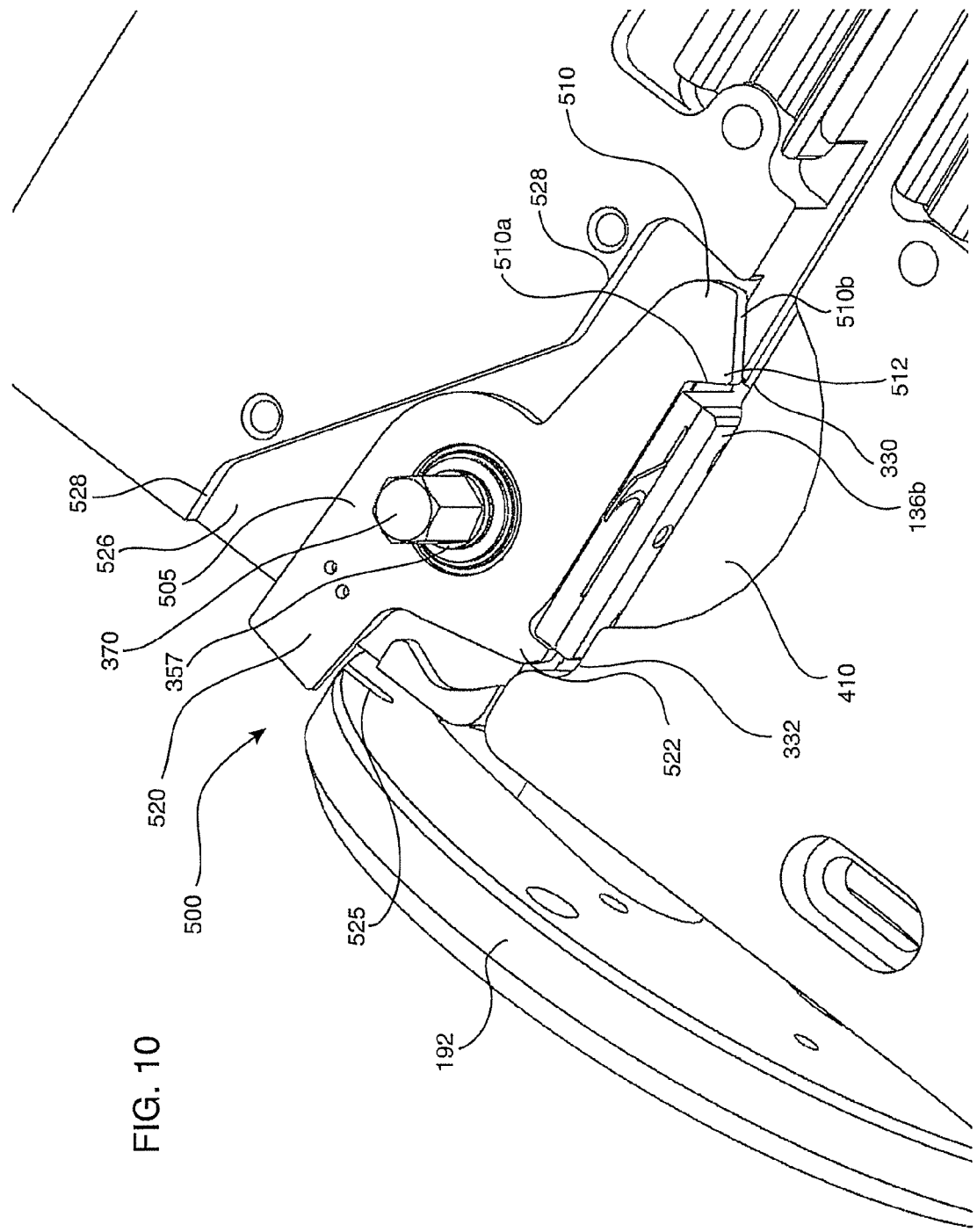
FIG. 10 is a perspective view of the apparatus showing the cutting device in its home position releasably retained therein by a latch plate of a stop mechanism also having a cover plate that is removed to illustrate the latch plate.
Figure 11:
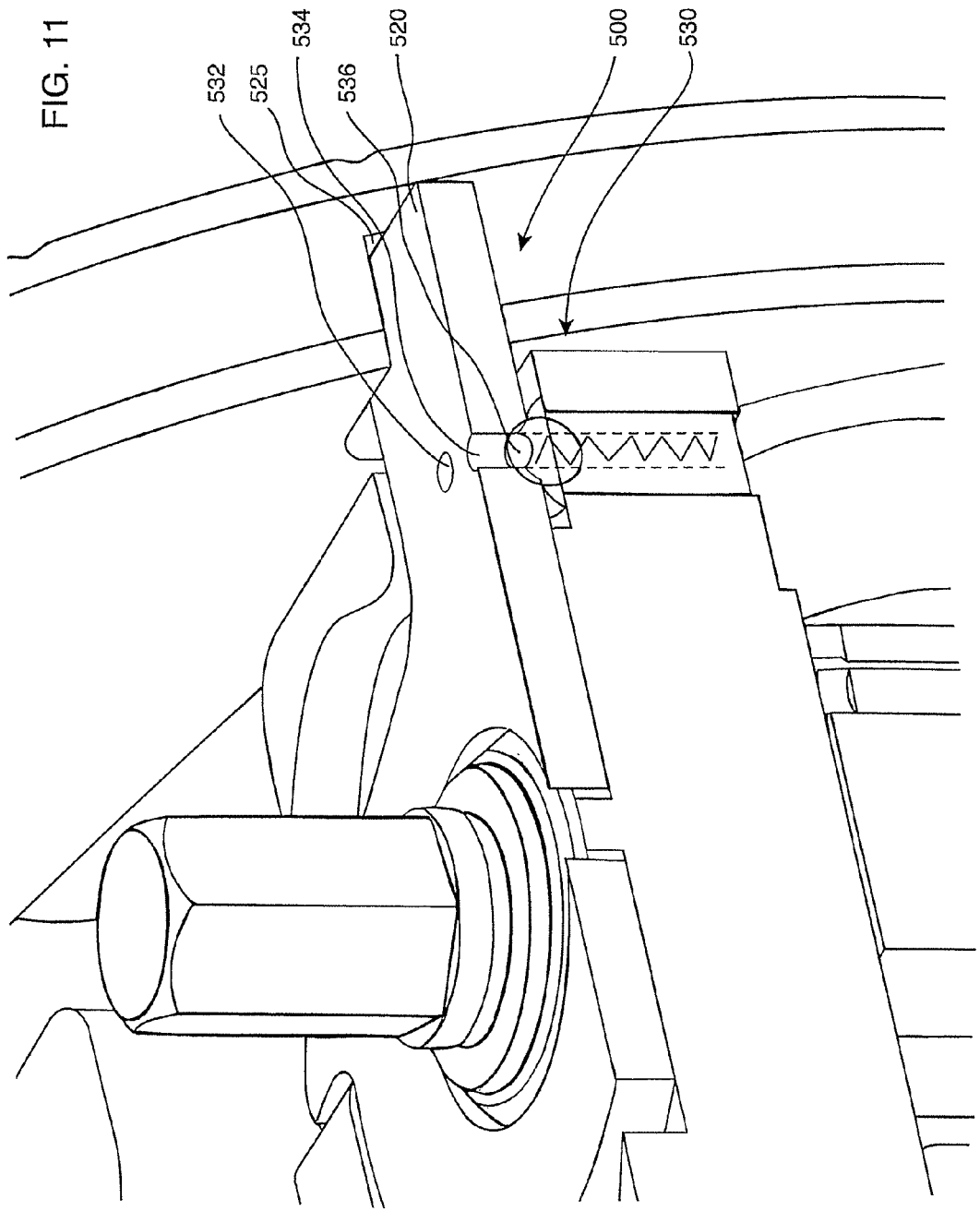
FIG. 11 is a fragmentary, perspective view of a detent mechanism that releasably retains the latch plate in either a carriage stop position or a cam stop position via corresponding apertures in the latch plate showing a detent ball biased into the latch plate aperture corresponding to the cam stop position.

As illustrated in FIGS. 10 and 11, a stop mechanism 500 is provided so that the cutting device 130, the platen devices 60 and 65, and the heating device 55, avoid interfering with each other during their operation, which could potentially damage these components of the apparatus 5. The stop mechanism 500 is operable to block movement of the cutting device 130 from the home position 410 when the platen devices 60 and 65 and heating device 55 are not in their corresponding positions with the actuator lever 185 positioned in the belt cutting/loading position 160. The stop mechanism 500 also preferably blocks movement of the actuator lever 185 in the belt cutting/loading position 160 for moving the platen devices 60 and 65 and the heating device 55 when the cutting device 130 has been shifted out from the home position 410.

As shown, the stop mechanism 500 includes a rotatable latch plate 505. Latch plate 505 is mounted to be rotatable about the drive shaft 355. Latch plate 505 includes a cam projection 510 having cam surfaces 510a and 510b for being contacted by the carriage portion 136b as the carriage 135 moves toward and away from the home position 410. The cam surfaces 510a and 510b extend obliquely to the longitudinal direction 150 so that when cammingly engaged with the carriage portion 136b traveling in the longitudinal direction 150, the plate 505 is rotated between a carriage stop position and a cam stop position.

The plate 505 includes a locking projection portion 520 for fitting in a slot opening 525 in the cam disc 190 when the lever actuator 185 and the cam disc 190 are in the belt cutting/loading position 160. When the carriage 135 is moved out from the home position 410, the carriage portion 136b contacts the cam surface 510a to rotate the plate 505 about the shaft 355 so that the locking projection portion 520 is received in the disc slot opening 525. With the locking projection portion 520 in the slot 525, the actuator lever 185 is locked against rotating the cam disc 190 so that an operator cannot move the platen devices 60 and 65 or the heating device 55 from their positions with the actuator lever 185 in the belt cutting/loading position 160. As such, the platen devices 60 and 65 cannot be moved closer together toward their position for the belt joining position 170 of the actuator lever 185 and the heating device 55 cannot be shifted to its raised position for the belt heating position 165 of the actuator lever 185 while the carriage portion 136b is out from its home position 410 in the platen gap 115. In this manner, the stop mechanism 500 is operable so that the platen devices 60 and 65 and the heating device 55 cannot be shifted into contact with the cutting device 130 that could potentially cause damage to these components of the apparatus 5.

When the carriage 135 is being moved toward the home position 410, the latch plate 505 will have been rotated so that the corner 512 at the juncture of the cam surfaces 510a and 510b will normally be in clearance with the carriage portion 136b so that it can be moved into its home position 410. If the plate 505 has been rotated back so that the corner 512 is in an interfering position with travel of the carriage 135 back to the home position 410, the carriage 135 will engage cam surface 510b as it moves longitudinally into the home position 410 to cause the plate 505 to rotate so that the carriage 135 can clear the corner 512 thereof. The plate 505 includes a rear finger projection portion 522 that will be engaged by the carriage portion 136b as it is fully advanced into the home position 410 to rotate the plate 505 to the carriage stop position with the locking portion 520 removed from the disc slot 525.

After the belt ends 10 and 15 have been cut, an operator will rotate the lever actuator 185 and disc 190 to the heating position 165 and then the joining position 170 such that the cam disc slot 525 will no longer be aligned with the locking projection portion 520 of the plate 505. Thus, if an operator attempts to operate the cutting member drive mechanism 310 to move the cutting device 130, the carriage portion 136b will contact the cam surface 510a of the plate 505. However, as the plate 505 begins to rotate, the locking projection portion 520 will engage the outer peripheral surface 192 of the cam disc 190 since the slot 525 is no longer aligned therewith. Thus, the cam surface 510a will remain in interference with the carriage portion 136b keeping the carriage 135 from being moved out of the home position 410 unless the lever actuator 185 is in the belt cutting/loading position 160. This keeps the cutting device 130 from engaging the platen devices 60 and 65 when they are in the belt joining position 170 or the heating device 55 when it is in its raised position in the belt heating position 165. Thus the cutting device 130 is retained in the home position 410 when the actuator lever 185 is not in the belt cutting/loading position 160. However, to allow the platen devices 60 and 65 to shift closer together by moving the lever actuator 185 to the belt joining position 170 with the cutting device 130 in the home position, the platen device 65 has a recessed pocket 332 cut in its inner edge surface 330 to provide clearance for the carriage portion 136b as the platen devices 60 and 65 are moved closer together. Alternatively, platen device 60 could be provided with a recessed pocket, or both devices 60 and 65 could include such pockets.

Continuing reference to FIGS. 10 and 11, the platen device 60 has a cutout recess 526 in which the plate 505 is mounted for rotation. The recess 526 includes wall portions 528 that restrict the amount of rotation of the plate 505 therein. Further, the plate 505 is releasably retained in the carriage stop position and the cam stop position via detent mechanism 530. More specifically, the latch plate 505 has a pair of apertures 532 and 534 that correspond with the carriage stop position and the platen and heater devices stop position, respectively. As shown in FIG. 11, the latch plate projection portion 520 is received in the disc slot 525, and a spring biased detent ball 536 is urged into the aperture 534. In this position, (i.e., the cam stop position) the platen devices 60 and 65 and heating device 55 cannot be shifted from their positions in the belt cutting/loading position 160 since the lever actuator 185 cannot be turned. On the other hand, when the cutting device 130 is in its home position 410, the detent ball 536 will be urged into aperture 532 with the latch plate projection portion 520 rotated out of the disc slot 525, as shown in FIG. 10. In this position of the latch plate 505 (i.e., the carriage stop position), the cutting device 130 can only be moved out of its home position 410 when the lever actuator 185 is rotated to the belt cutting/loading position 160 to align the slot 525 with the lever projection portion 520, as shown. Otherwise, movement of the cutting device 135 from the home position 410 will be stopped due to engagement of the plate projection portion 520 with the cam disc peripheral surface 192.

To keep the latch plate 505 from being urged upwardly under the influence of the spring biased detent ball 536, cover plate 425 is fastened to the platen device 60, as best seen in FIGS. 5 and 6. Thus, rotation of the latch plate 505 between the carriage stop position and the platen and heating devices stop position will cause the ball 536 to be urged downwardly against its spring bias since the cover plate 425 rigidly secured to the platen device 60 over the latch plate 505 prevents the latch plate 505 from being shifted upwardly by the spring biased detent ball 536. In addition, on its laterally inner end, the cover plate 425 includes an upturned flange wall portion 427 that is disposed laterally adjacent to the blade 140 in between the blade 140 and the drive actuator head 370 to shield the blade 140 from the operator when the cutting device 130 is in its home position.

As shown in FIGS. 1 and 12-15, the apparatus 5 is preferably configured to weld together the ends 10 and 15 of one or more positive drive monolithic conveyor belts 2. As mentioned previously, in this regard, upper surfaces 70 and 75 of the platen devices 60 and 65 may include openings in the form of grooves 400 for receiving projections or drive bars 405 of the positive drive belt 2. The drive bars 405 extend orthogonally to the longitudinal axis 406 of the belt 2. At least one drive bar 405 near the end edge portion of the conveyor belt end 10 is tightly received in one of the grooves 400 and is clamped therein. In this manner, the belt 2 is securely aligned so that the cutting device 130 will cut orthogonally across the lateral width of the conveyor belt end 10 or 15 as the cutting device 130 travels in the longitudinal direction 150.

The platen device grooves 400 may also be configured so that, for example, with the conveyor belt end 10 loaded on the platen device 60 with the drive bars 405 received in the grooves 400, the amount of material that is cut by the cutting device 130 is sufficient to maintain the predetermined pitch distance, e.g., 1 or 2 inches, between adjacent drive bars 405 of the belt ends 10 and 15 after they are joined together. To this end, in the belt cutting/loading position 160 at least the drive bar grooves 400a of the platen devices 60 and 65 adjacent to the gap 115 are each spaced a predetermined lateral distance from the cutting edge 140a of the blade 140 centered in the gap 115 as it travels in the longitudinal direction 150. In one approach, in the belt cutting position 160 the combined predetermined lateral distances between centers of the grooves 400a and the cutting edge 140a or simply the lateral distance between the centers of the adjacent grooves 400a is approximately equal to the pitch distance plus the amount of clash or belt overlap that will occur when the belt ends 10 and 15 are shifted from the belt cutting/loading position 160 to the belt joining position 170. Alternatively, the drive bar grooves 400a could be spaced by a multiple of the pitch distance plus the clash or belt overlap distance when in the belt cutting position 160. Manifestly, when in the belt cutting position 165, the distance between the centers of the drive bar receiving grooves 400a will be equal to the pitch distance, or alternatively a multiple thereof.

As best seen in FIGS. 12-15, the platen devices 60 and 65 preferably include respective platen members 66 and 67 and removable platen inserts or insert strips 420 sized to be received in channels, or insert receiving grooves 66a and 67a adjacent to the gap 115. As shown, these grooves 66a and 67a are preferably closest to the gap 115, however they could be located at other locations, and preferably at corresponding locations on each platen device 60 and 65. The platen inserts 420 have specially configured drive bar receiving grooves 400a that are sized to correspond to and snugly receive the drive bars 405 of a particular type of positive drive belt 2 therein. The remaining grooves 400 of the platen members 66 and 67 can be wider than the drive bar grooves 400a so that they are clearance grooves 400 for the drive bars 405. Once the belt end 10 or 15 is loaded on the platen device 60 or 65 to matingly tightly fit one of their drive bars 405 in the insert groove 400a, the corresponding clamp bar 80 or 85 is clamped down on the belt end 10 or 15 for the cutting operation, as has previously been discussed.

Figure 13:
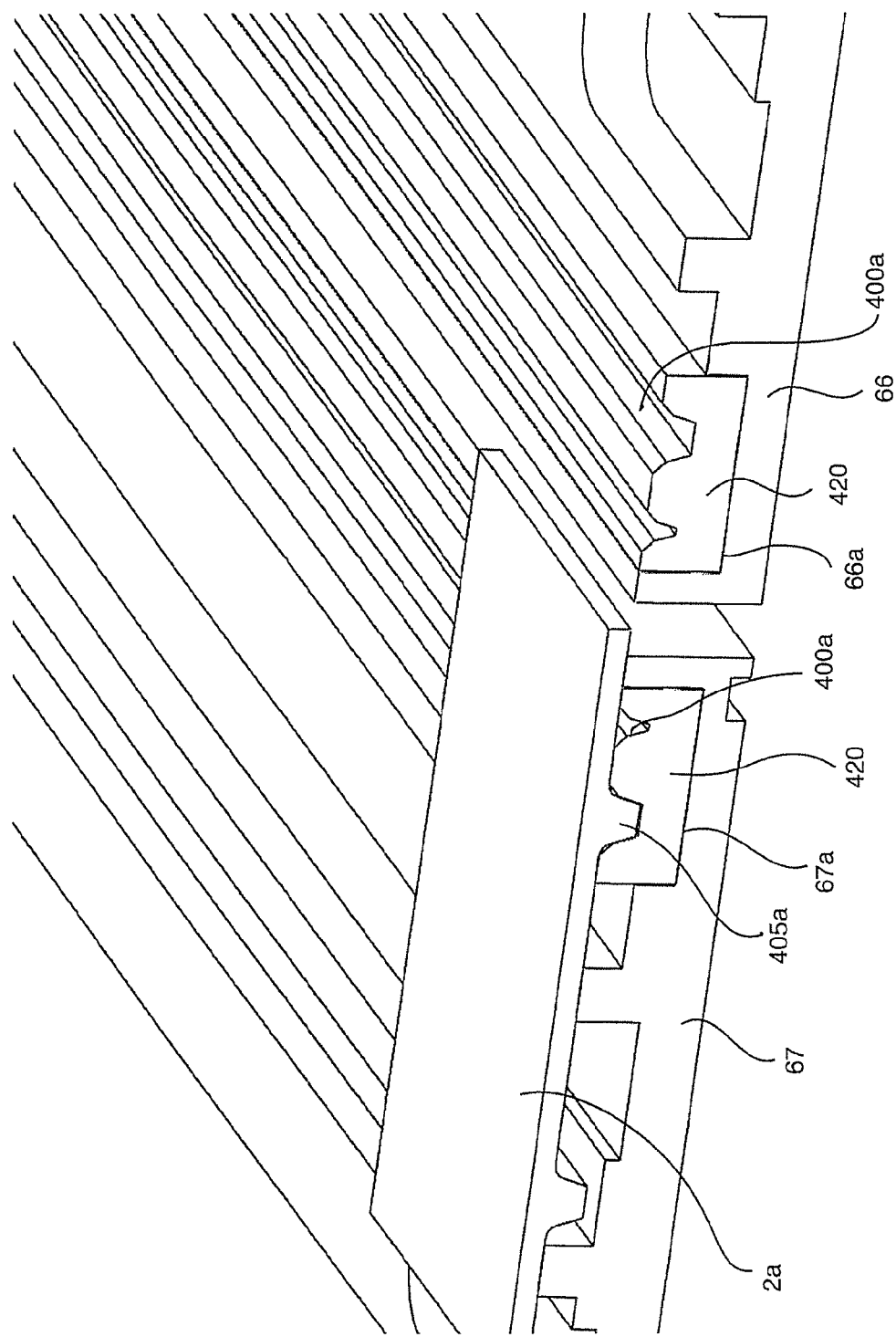
Figure 14:
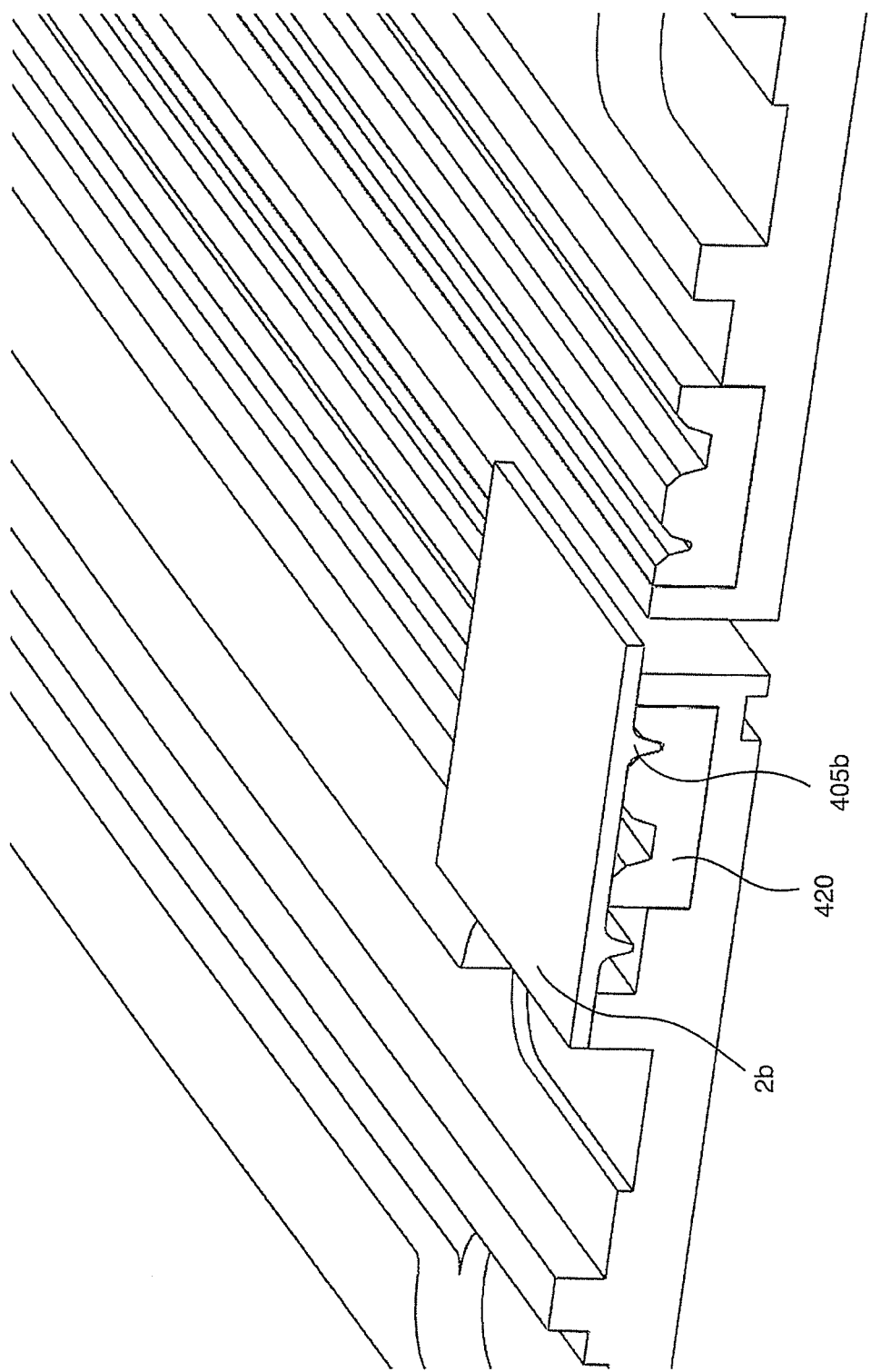

In certain instances, the inserts 420 can have two such drive bar receiving grooves 400a that are differently configured from each other for receiving drive bars 405 from different positive drive belts 2 (see belt 2a with drive bars 405a in FIG. 13 and belt 2b with drive bars 405b in FIG. 14). In this manner, only one insert 420 is needed for two different belts 2a and 2b with corresponding different drive bars 405a and 405b, respectively. It should also be noted that the insert receiving grooves 66a and 67a can be of sufficient width that they also receive another adjacent drive bar 405 in clearance therein in addition to the insert 420, as shown in FIG. 14.

Figure 15:
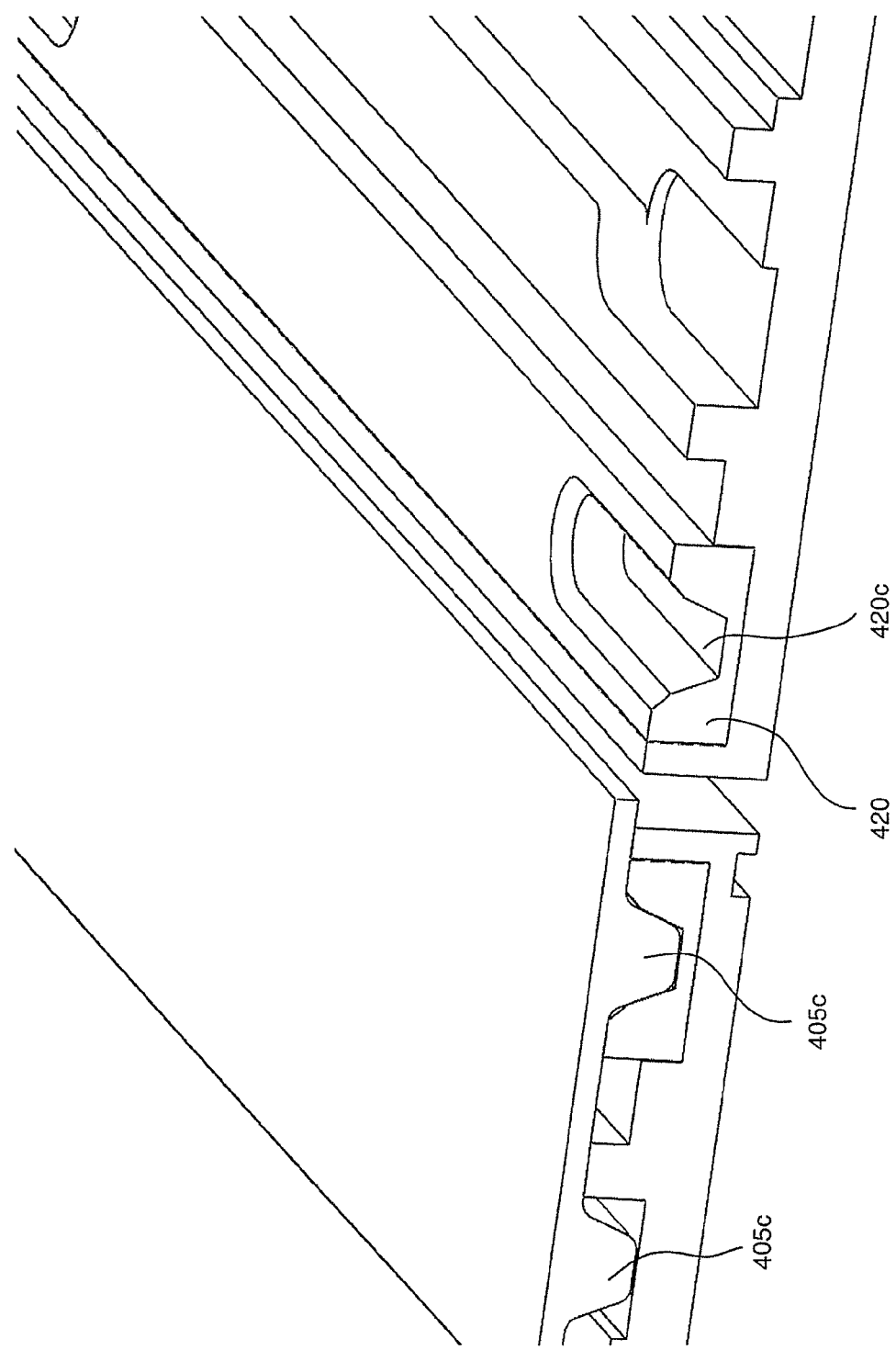

Referring to FIG. 15, it can be seen that when the drive bars 405 consist of rows of drive lugs 405c, the insert 420 can have corresponding rows of recessed wells 400c rather than a continuous drive bar receiving groove 400. Herein, the term groove includes a row of such wells. In this manner, platen inserts 420 having grooves 400a corresponding to one or more different positive drive conveyor belts 2 with different pitches and differently configured drive bars 405 can be used so that different positive drive conveyor belts may be cut and joined using the same apparatus 5 without having to change the platen members 66 and 67 thereof.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of cutting and joining together the ends of one or more conveyor belts, the method comprising:
   supporting one of a pair of conveyor belt ends on one of a pair of adjacent belt supports;
   driving a cutting device in a longitudinal direction between the belt supports to remove belt material from the one conveyor belt end with the one conveyor belt end supported on the one belt support;
   guiding the cutting device with the belt supports as the cutting device is driven therebetween;
   disposing a heating device between the belt supports with the belt ends supported thereon for melting belt material of the belt ends; and
   moving one of the conveyor belt ends toward the other conveyor belt end to join the belt ends together,
   wherein driving the cutting device comprises driving a carriage of the cutting device in the longitudinal direction with the carriage having a cutting blade fixed thereto and extending upward therefrom between the belt supports so that the cutting blade travels in the longitudinal direction between the belt supports as the carriage is driven in the longitudinal direction.

2. The method of claim 1, wherein supporting the one conveyor belt end on the one belt support includes disposing drive bars of the one conveyor belt end within grooves of a platen device, driving the cutting device includes shifting the cutting device in the longitudinal direction across a lateral width of the supported conveyor belt end to square the end thereof, and disposing the heating device between the belt supports includes positioning the heating device between the belt ends to extend in the longitudinal direction so that the heating device uniformly heats the conveyor belt ends across the lateral widths thereof.

3. The method of claim 1, further comprising:
   shifting the one belt support to a belt cutting position to form a gap between the belt supports that has approximately the same width as a width of the carriage of the cutting device that travels between the belt supports, and
   driving the cutting device in the longitudinal direction between opposing bearing surfaces of the belt supports so that bearing surfaces of the carriage bear against the bearing surfaces of the belt supports to guide the cutting device in the longitudinal direction.

4. The method of claim 1, wherein the conveyor belt ends are supported on adjacent belt supports by fitting a drive bar of one conveyor belt end in a groove of one of the belt supports, wherein the groove is spaced by a predetermined lateral distance from a cutting blade of the cutting device, and fitting a drive bar of the other belt end in a groove of the adjacent belt support spaced by a predetermined lateral distance from the cutting blade, and driving the cutting device includes driving the carriage including the cutting blade between the belt supports to remove belt material from the other belt end, with the predetermined lateral distances being sized to maintain a predetermined pitch distance between adjacent ribs of the conveyor belt ends when the belt ends are joined together.

5. The method of claim 4, further comprising heating the belt ends to melt the belt material thereof and shifting the belt supports toward each other to move end portions of the belt end to clash together to join the conveyor belt ends together.

\* \* \* \* \*